United States Patent [19]

Katsura et al.

[11] Patent Number: 4,975,857
[45] Date of Patent: Dec. 4, 1990

[54] GRAPHIC PROCESSING APPARATUS UTILIZING IMPROVED DATA TRANSFER TO REDUCE MEMORY SIZE

[75] Inventors: Koyo Katsura, Hitachiota; Shinichi Kojima, Maebashi; Noriyuki Kurakami, Takasaki, all of Japan

[73] Assignee: Hitachi, Ltd., Tokyo, Japan

[21] Appl. No.: 302,332

[22] Filed: Jan. 27, 1989

[30] Foreign Application Priority Data

Apr. 18, 1988 [JP] Japan ................................ 63-93448

[51] Int. Cl.[5] ............................................ G06F 15/20
[52] U.S. Cl. ..................................... 364/518; 340/798; 364/521
[58] Field of Search ................. 364/518, 521; 340/798, 340/799, 800, 802; 365/189.04, 230.04, 233

[56] References Cited

U.S. PATENT DOCUMENTS

| 4,563,676 | 1/1986 | Leininger | 340/802 X |
| 4,755,810 | 7/1988 | Knierim | 340/799 X |
| 4,757,310 | 7/1988 | Katsura et al. | 340/802 X |
| 4,796,231 | 1/1989 | Pinkham | 340/799 X |
| 4,817,054 | 3/1989 | Banergee et al. | 340/799 X |
| 4,847,809 | 7/1989 | Suzuki | 340/799 X |

FOREIGN PATENT DOCUMENTS 129387 10/1980 Japan .
136793 12/1983 Japan .
225888 11/1985 Japan .

Primary Examiner—Dale M. Shaw
Assistant Examiner—H. R. Herndon
Attorney, Agent, or Firm—Antonelli, Terry, Stout & Kraus

[57] ABSTRACT

A Memory Interface and Video Attribute Controller (MIVAC) is inserted between a dynamic RAM (DRAM) capable of a consecutive data read operation, such as the operation associated with the static column mode, page mode, or nibble mode, and a graphic processor to provide a parallel data processing. A serial data transfer is executed on each data bus between the MIVAC and the DRAM, whereas parallel data transfer is conducted between the MIVAC and the graphic processor. As a result, the graphic processor can be configured with a reduced number of DRAMs so that the graphic processor operates without paying attention to the consecutive data read mode of the DRAM.

8 Claims, 36 Drawing Sheets

FIG. 3a

| ITEM | TERMINAL NO. | TERMINAL NAME | INPUT/OUTPUT | FUNCTION |
|---|---|---|---|---|
| POWER SUPPLY | 35, 68 | Vcc | — | +5V IS SUPPLIED. |
| | 17, 18 51, 52 | Vcc | — | GND IS CONNECTED. |
| OPERATION CONTROL SIGNAL | 65 | INCLK | INPUT | BASIC CLOCK OF MIVAC IS INPUTTED. |
| | 66 | TEST | INPUT | MIVAC OPERATION IS TESTED. SET THIS TERMINAL TO "LOW" LEVEL. |
| ACRTC INTERFACE SIGNAL | 15 | 2CLK | OUTPUT | 2CLK SIGNAL IS SUPPIED TO ACRTC. THIS SIGNAL IS ASYMMETRIC. NAMELY, HAS DIFFERENT CYCLE LENGTHS IN THE FIRST HALF AND SECOND HALF OF A MEMORY CYCLE. |
| | 14 | MCYC | INPUT | MCYC SIGNAL FROM ACRTC IS INPUTTED. MCYC INDICATES "LOW" AND "HIGH" LEVELS WHEN ACRTC IS IN ADDRESS AND DATA CYCLES, RESPECTIVELY. |
| | 12 | $\overline{DRAW}$ | INPUT | $\overline{DRAW}$ SIGNAL FROM ACRTC IS INPUTTED. $\overline{DRAW}$ INDICATES WHETHER OR NOT ACRTC IS IN THE DRAW CYCLE. $\overline{DRAW}$ IS "LOW" LEVEL IN THE DRAW CYCLE AND IS "HIGH" LEVEL IN THE OTHER CYCLES. |
| | 11 | MRD | INPUT | MRD SIGNAL FROM ACRTC IS INPUTTED. MRD CONTROLS DATA TRANSFER DIRECTION BETWEEN FRAME BUFFER AND ACRTC. WHEN DATA IS READ FROM FRAME BUFFER, "HIGH" LEVEL IS INPUTTED. WHEN DATA IS WRITTEN IN FRAME BUFFER, "LOW" LEVEL IS INPUTTED. |
| | 13 | $\overline{AS}$ | INPUT | $\overline{AS}$ SIGNAL IS INPUTTED FROM ACRTC. $\overline{AS}$ INDICATES PRESENCE OR ABSENCE OF MEMORY ACCESS. |
| | 64 | $\overline{HSYNC}$ | INPUT | $\overline{HSYNC}$ SIGNAL IS INPUTTED FROM ACRTC. UNDER CONDITIONS OF $\overline{HSYNC}$="LOW" AND $\overline{DRAW}$="HIGH", IF $\overline{AS}$ PULSE IS RECEIVED, $\overline{CS}$ BEFORE $\overline{RAS}$ REFRESH OPERATION IS CARRIED OUT. |
| | 67 | $\overline{VSYNC}$ | INPUT | $\overline{VSYNC}$ SIGNAL IS INPUTTED FROM ACRTC. RECEIVED $\overline{VSYNC}$ IS DIVIDED BY TWO SO AS TO OUTPUTTED AS $\overline{VSYNC}$/2 SIGNAL AND IS ALSO USED TO CONTROL MULTIPLEXER OF VIDEO OUTPUT. |
| | 2 | DISP 1 | INPUT | DISP 1 SIGNAL IS INPUTTED FROM ACRTC. DISP 1 INDICATES SCREEN DISPLAY PERIOD. ORDINARILY, SET "1" TO DISPLAY SIGNAL CONTROL (DSC) BIT OF ACRTC. |
| | 1 | $\overline{CUD1}$ | INPUT | $\overline{CUD1}$ SIGNAL IS INPUTTED FROM ACRTC. $\overline{CUD1}$ IS LOADED WITH "LOW" LEVEL DURING GRAPHIC CURSOR DISPLAY PERIOD. |
| | 6-10 16 19-28 | MAD0 -MAD15 | INPUT/OUTPUT | MAD0-MAD15 OF ACRTC ARE INPUTTED. THESE SIGNALS ARE USED AS FRAME BUFFER ACCESS ADDRESS IN ADDRESS CYCLE FOR MCYC="LOW", AS DATA INPUT/OUTPUT FOR DATA TRANSFER BETWEEN ACRTC AND FRAME BUFFER IN DATA TRANSFER CYCLE FOR MCYC="HIGH". |
| | 29-32 | MA16-MA19 | INPUT | FRAME BUFFER ACCESS ADDRESS MA16-MA19 IS INPUTTED FROM ACRTC. |

F I G. 3b

| ITEM | TERMINAL NO. | TERMINAL NAME | INPUT/OUTPUT | FUNCTION |
|---|---|---|---|---|
| FRAME BUFFER INTERFACE SIGNAL | 50 | $\overline{RAS}$ | OUTPUT | $\overline{RAS}$ TIMING SIGNAL IS OUTPUTTED FOR DRAM. |
| | 49 | $\overline{CS}$ | OUTPUT | $\overline{CS}$ TIMING SIGNAL IS OUTPUTTED FOR DRAM. |
| | 48 | $\overline{WE}$ | OUTPUT | $\overline{WE}$ TIMING SIGNAL IS OUTPUTTED FOR DRAM. |
| | 53 | $\overline{OE}$ | OUTPUT | $\overline{OE}$ TIMING SIGNAL IS OUTPUTTED FOR DRAM. |
| | 56,58 60,62 63,61 59,57 55,54 | FA0- FA9 | OUTPUT | MULTIPLEX ADDRESS IS OUTPUTTED FOR DRAM. ADDRESS TO BE MULTIPLEXED VARIES DEPENDING ON VCF0-VCF3 AND VMD0 ATTRIBUTE CODES. |
| | 44,46 47,45 40,42 43,41 | FD0- FD7 | INPUT/ OUTPUT | FD IS 8-BIT INPUT/OUTPUT SIGNAL FOR DATA TRANSFER BETWEEN ACRTC AND FRAME BUFFER AND FOR FETCHING DISPLAY DATA READ FROM FRAME BUFFER. IN A CASE OF ONE MEMORY CHIP, FD0-FD3 ARE USED, WHEREAS IN A CASE OF TWO FOUR MEMORY CHIPS, FD0-FD7 ARE USED. |
| CRT DISPLAY INTERFACE SIGNAL | 3 | DOTCLK | OUTPUT | DOTCLK SIGNAL IS DELIVERED BY DIVIDING INCLK SIGNAL AS BASIC INPUT SIGNAL OF MIVAC BY 1, 2 OR 4. DIVISION RATIO IS SET DEPENDING ON VCF0-VCF3 OF ATTRIBUTE CODE. |
| | 33,34 36,37 | VIDEO A -VIDEO D | OUTPUT | VIDEO A-D SIGNAL IS 4-BIT OUTPUT SIGNAL WHICH IS OBTAINED BY CONVERTING DISPLAY DATA FROM PARALLEL SIGNAL INTO SERIAL SIGNAL BY SHIFT REGISTER OF MIVAC AND WHICH IS DELIVERED DURING DISPLAY PERIOD INDICATED BY SHFTEN OUTPUT. 4-BIT VIDEO SIGNAL IS DETERMINED BY ATTRIBUTE CODE VCF0-VCF3. |
| | 5 | SHFTEN | OUTPUT | SHFTEN INDICATES DISPLAY PERIOD OF VIDEO SIGNAL AND IS SET TO "HIGH" LEVEL DURING DISPLAY PERIOD. IN SINGLE ACCESS, $\overline{DISP1}$ FROM ACRTC IS ELONGATED BACKWARD BY ONE CYCLE, AND IN DUAL ACCESS, $\overline{DISP1}$ IS ELONGATED BACKWARD BY TWO CYCLES SO AS TO PRODUCE THIS SIGNAL. |
| | 4 | VSYNC/2 | OUTPUT | VSYNC/2 SIGNAL IS INPUTTED TO ACRTC. VSYNC IS DIVIDED BY TWO FOR PRODUCING THIS SIGNAL. |
| OTHERS | 38 | $\overline{BL2IRQ}$ | OUTPUT | $\overline{BL2IRQ}$ IS SET BY BLINK2(MA19) INPUTTED IN ATTRIBUTE CYCLE. DURING ATTRIBUTE CYCLE, WHEN BLINK2 IS AT "HIGH" LEVEL, $\overline{BL2IRQ}$ IS SET TO "LOW" LEVEL. |
| | 39 | $\overline{IRQCLR}$ | INPUT | $\overline{IRQCLR}$ SIGNAL IS USED TO CLEAR $\overline{BL2IRQ}$ SIGNAL. WHEN "LOW" IS INPUTTED TO $\overline{IRQCLR}$, $\overline{BL2IRQ}$ IS CLEARED TO "HIGH" LEVEL. |

FIG. 5a
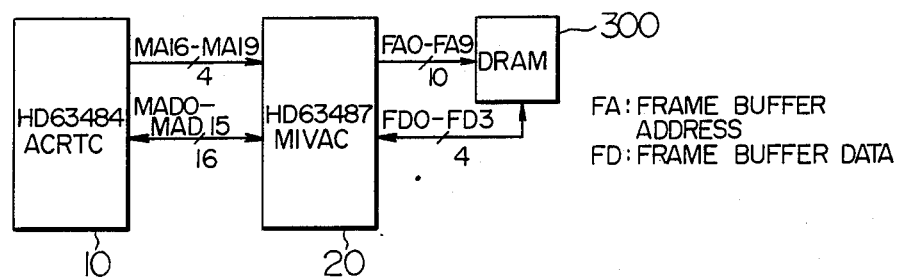
FIG. 5b 2-CHIP MEMORY
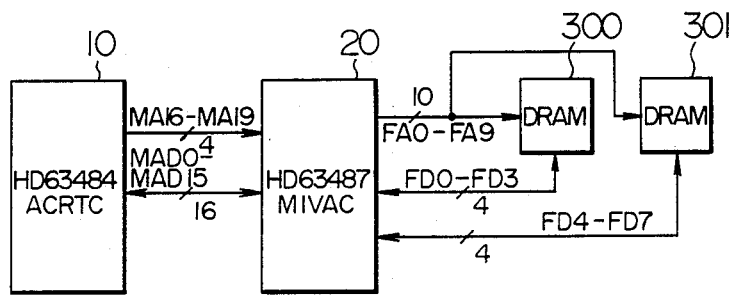
FIG. 5c
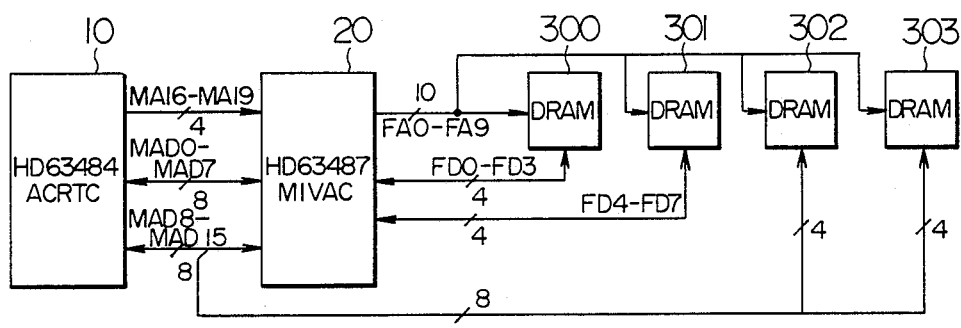

FIG. 9

| MODE | CRT SCREEN LAYOUT EXAMPLE (DOTS × RASTER) | MAXIMUM FRAME BUFFER CAPACITY (BYTES) | ACRTC OPERATION FREQUENCY (MHz) | MEMORY ACCESS SPEED | HIGH-SPEED DRAWING | NUMBER OF MEMORIES | COLOR/GRADATION | SHIFT AMOUNT (BITS) | MAXIMUM DOT CLOCK FREQ. (MHz) |
|---|---|---|---|---|---|---|---|---|---|
| 0 | 640×200, 350, 400, 480 | | 4.13 | 480ns/4ACCESSES | — | | | 16 | 33 |
| 1 | 640×200, 480×240, 320×200, 240 | 512K/128K | | | | 1 | 4 | 8 | 16.5 |
| 2 | 320×200, 240 266×192 | | | | | | 16 | 4 | 8.25 |
| 3 | 640×200, 350, 400, 480 | 1M/256K | | | | 2 | 4 | 16 | 33 |
| 4 | 640×200, 480×240, 320×200, 240 | | | | | | 16 | 8 | 16.5 |
| 5 | 640×200, 350, 400, 480 | 2M/512K | | | | 4 | | 16 | 33 |
| 6 | 640×200, 480×240, 320×200, 240 | 512K/128K | | | | | | | 16.5 |
| 7 | 320×200, 240 256×192, | | | | | | 4 | 8 | 8.25 |
| 8 | 640×200, 350, 400, 480 | | | | ○ | — | | 32 | 33 |
| 9 | 640×200, 480×240, 320×200, 240 | 1M/256K | | | | 2 | 4 | 16 | 16.5 |
| A | 320×200, 240 256×192 | | | | | | 16 | 8 | 8.25 |
| B | 640×200, 350, 400, 480 | 2M/512K | | | | 4 | 4 | 32 | 33 |
| C | 640×200, 480×240, 320×200, 240 | | | | | | 16 | 16 | 16.5 |
| D | 640×200, 350, 400, 480 | 512K/128K | | 960ns/16ACCESSES | — | 1 | 4 | 32 | 33 |
| E | 640×200, 480×240, 320×200, 240 | | | | | | 16 | 16 | 16.5 |
| F | 640×200, 350, 400, 480 | 1M/256K | | | | 2 | | 32 | 33 |

FIG. 10

| MODE | DOT CLOCK FREQUENCY |
|---|---|
| 0, 3, 5, 8 B, D, F | 33MHz ~ 11MHz |
| 1, 4, 6, 9 C, E | 16.5MHz ~ 5.5MHz |
| 2, 7, A | 8.25MHz ~ 2.75MHz |

FIG. 12

| VMD | MEMORY CHIP EMPLOYED |
|---|---|
| 0 | 256K × 4BIT DRAM |
| 1 | 1M × 4BIT DRAM |

FIG. 13

| MUXEN | VSYNC/2 | VIDEO A | VIDEO B |
|---|---|---|---|
| 0 | 0 | A | B |
|   | 1 | A | B |
| 1 | 0 | A | B |
|   | 1 | C | D |

FIG. 14

| BLINK 1 | GRAPHIC CURSOR DISPLAY |
|---|---|
| 0 | NOT DISPLAYED |
| 1 | DISPLAYED |

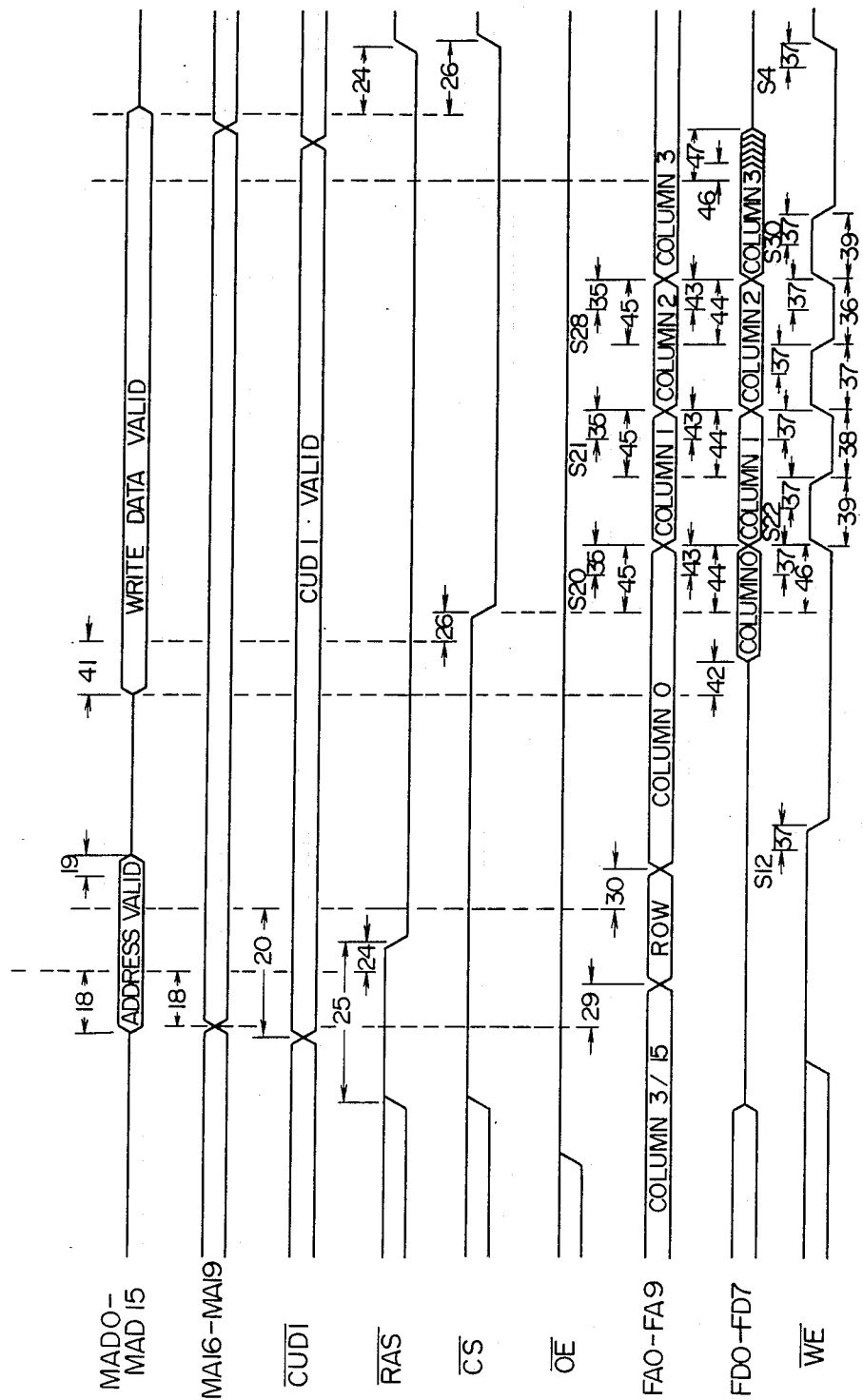

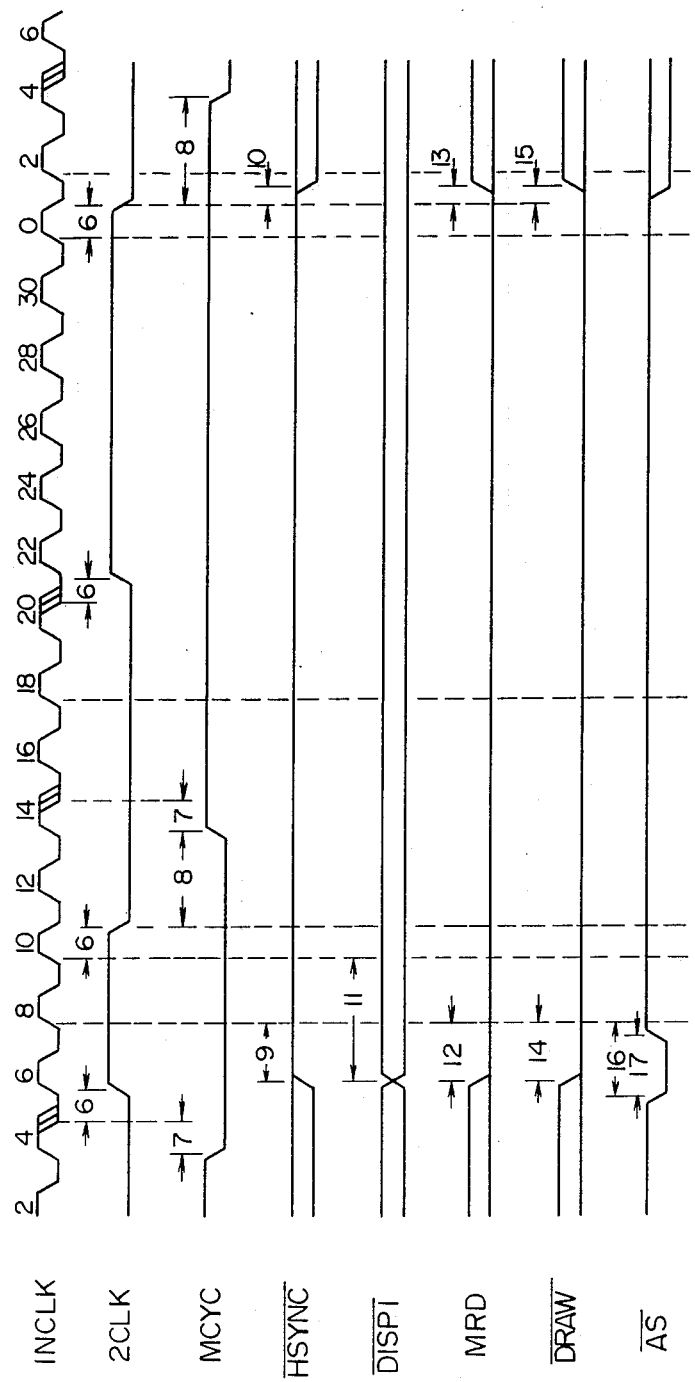

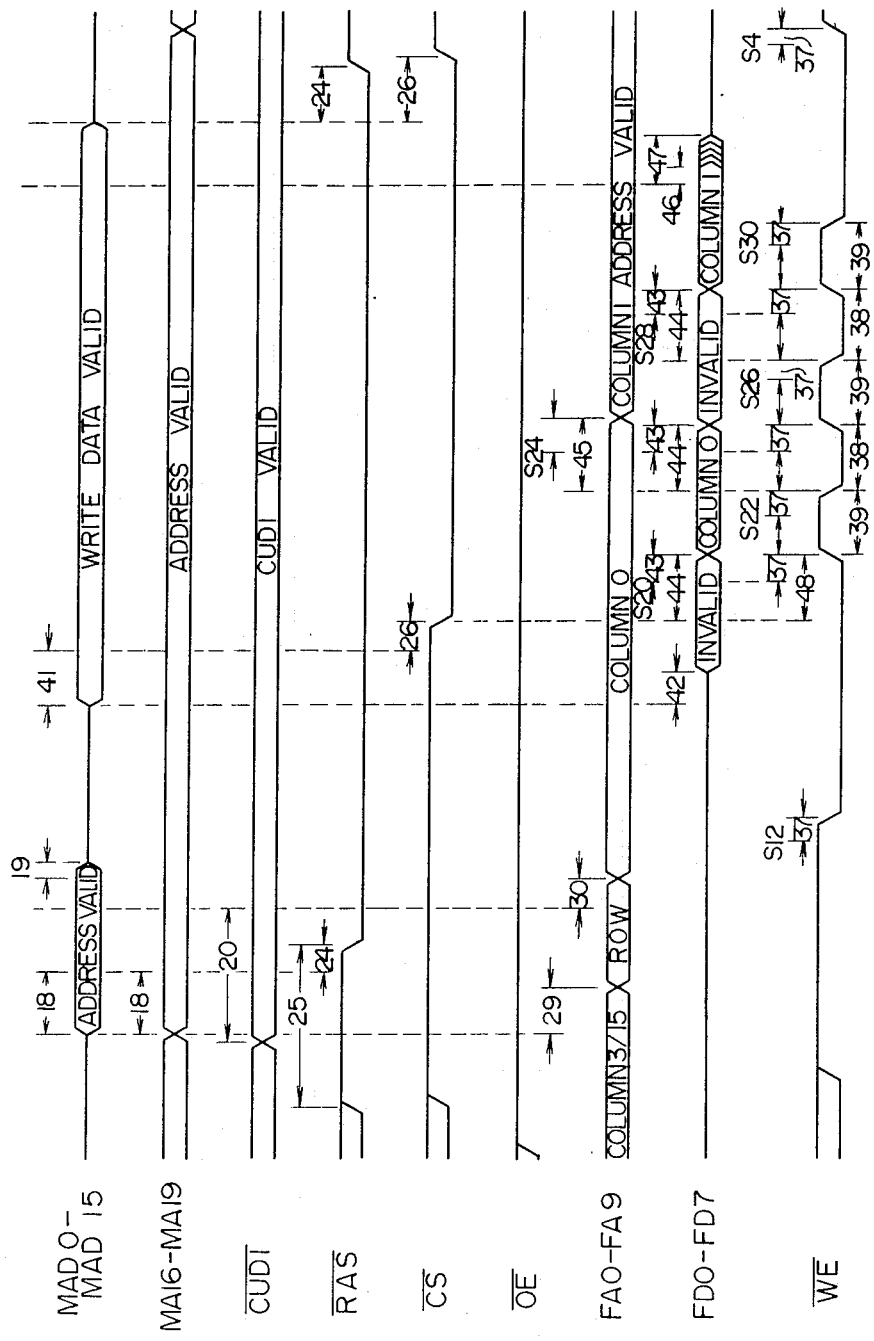

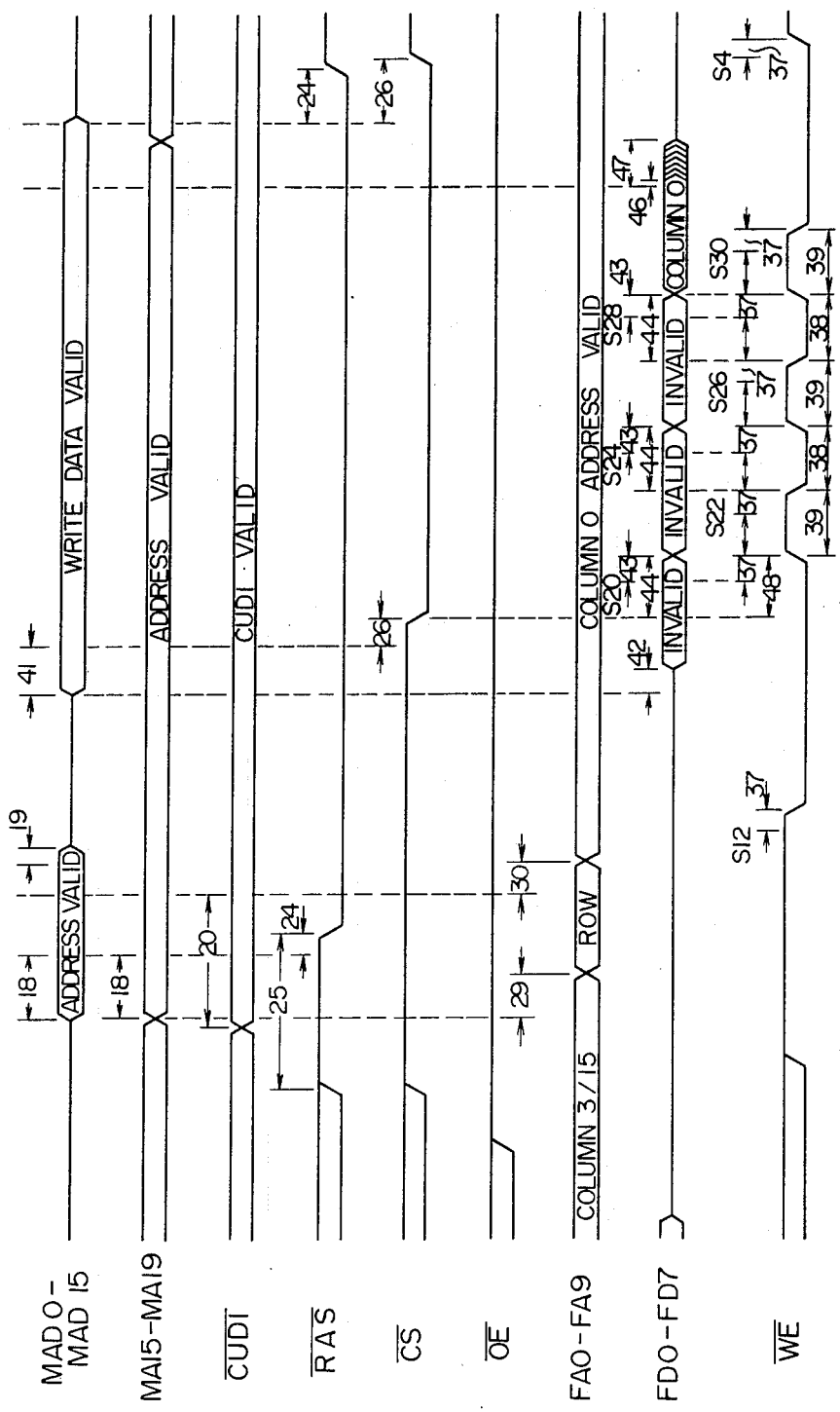

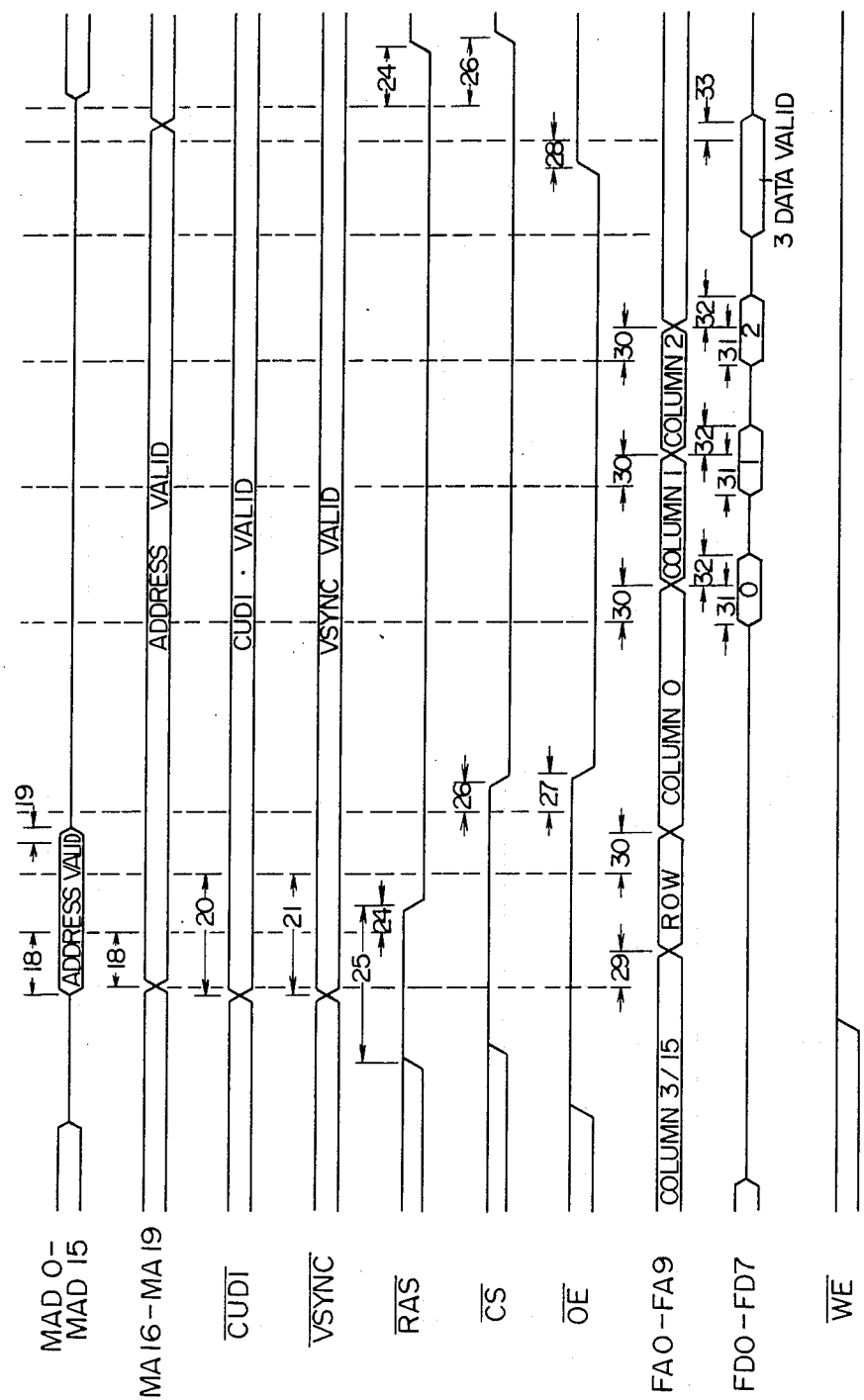

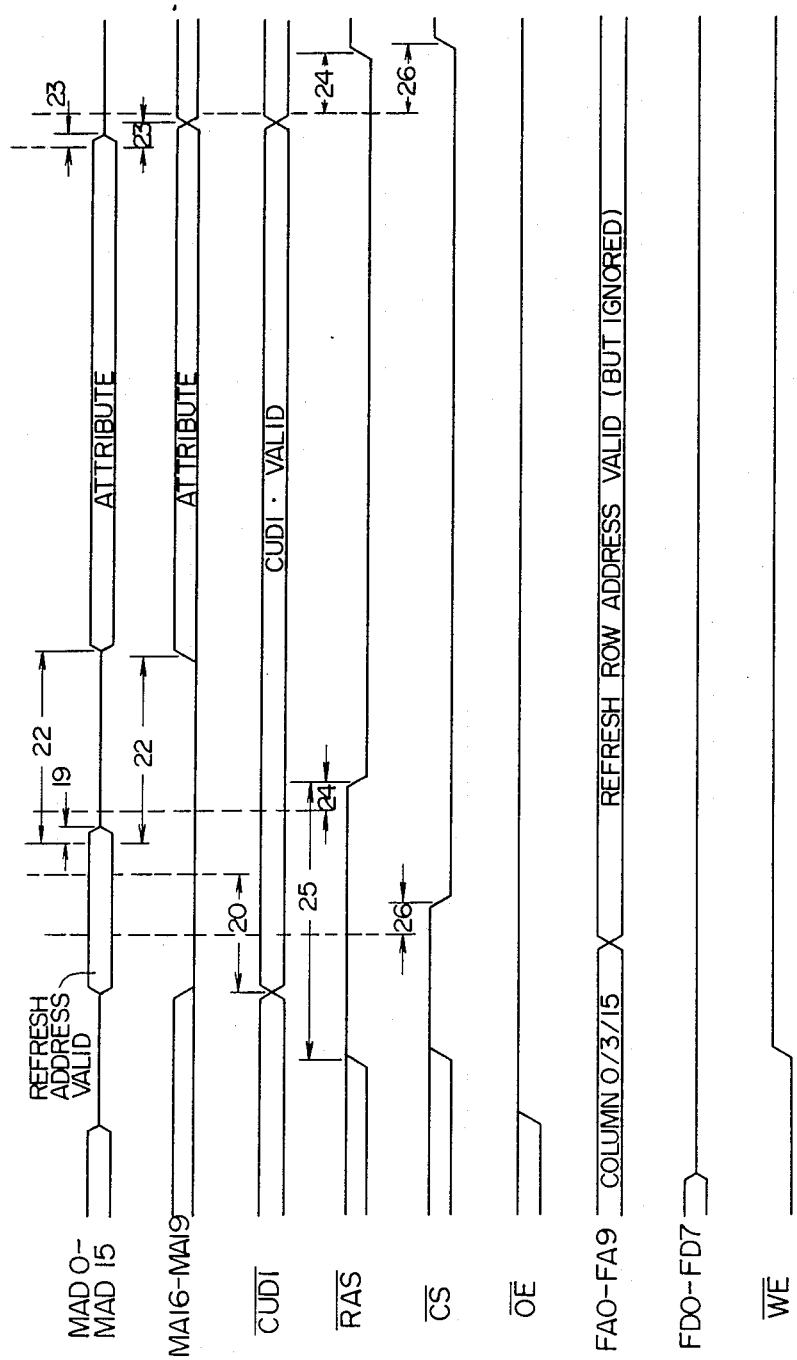

FIG. 28

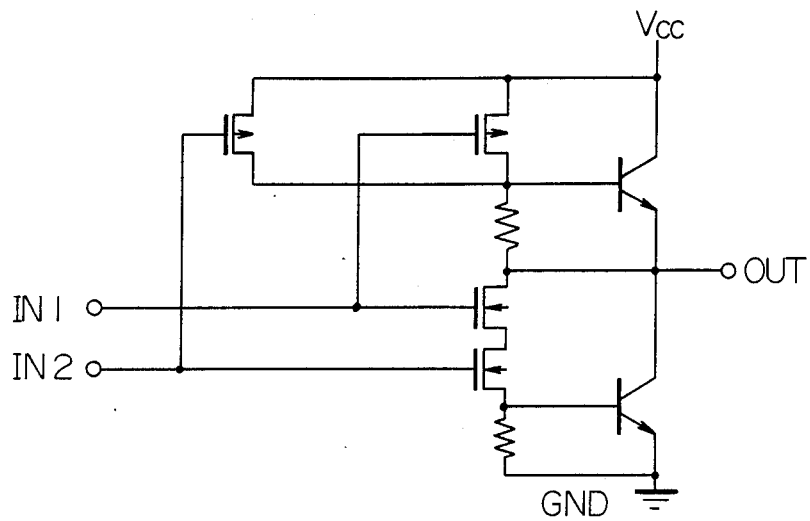

FIG. 29a

| FA | 4 ACCESSES / MCYC (DRAW, DISPLAY) | | | | 16 ACCESSES / 2 MCYCS (DISPLAY) | | | |
|---|---|---|---|---|---|---|---|---|
| | 256K x 4-BIT (VMD0=0) | | 1M x 4-BIT (VMD0=1) | | 256K x 4-BIT (VMD0=0) | | 1M x 4-BIT (VMD0=1) | |
| | ROW | COLUMN | ROW | COLUMN | ROW | COLUMN | ROW | COLUMN |
| 9 | — | — | MAD8 | NC0 | — | — | MAD8 | NC0 |
| 8 | MAD9 | NC1 | MAD9 | NC1 | MAD9 | NC1 | MAD9 | NC1 |
| 7 | MAD8 | NC2 | MA17 | MAD7 | MAD8 | NC2 | MA17 | MAD7 |
| 6 | MAD7 | MAD6 | MA16 | MAD6 | MAD7 | MAD6 | MA16 | MAD6 |
| 5 | MAD15 | MAD5 | MAD15 | MAD5 | MAD15 | MAD5 | MAD15 | MAD5 |
| 4 | MAD14 | MAD4 | MAD14 | MAD4 | MAD14 | MAD4 | MAD14 | MAD4 |
| 3 | MAD13 | MAD3 | MAD13 | MAD3 | MAD13 | MAD3 | MAD13 | MAD3 |
| 2 | MAD12 | MAD2 | MAD12 | MAD2 | MAD12 | MAD2 | MAD12 | MAD2 |
| 1 | MAD11 | MAD1 | MAD11 | MAD1 | MAD11 | WC1 | MAD11 | WC1 |
| 0 | MAD10 | MAD0 | MAD10 | MAD0 | MAD10 | WC0 | MAD10 | WC0 |

⌐ ¬
└ ┘ : COLUMN ADDRESS COUNTER

FIG. 29b

| FA | 2 ACCESSES/MCYC (DRAW) | | | | 4 ACCESSES/MCYC (DISPLAY) | | | | 16 ACCESSES/2MCYCS (DISPLAY) | | | |
|---|---|---|---|---|---|---|---|---|---|---|---|---|
| | 256K×4-BIT (VMD0=0) | | 1M×4-BIT (VMD0=1) | | 256K×4-BIT (VMD0=0) | | 1M×4-BIT (VMD0=1) | | 256K×4-BIT (VMD0=0) | | 1M×4-BIT (VMD0=1) | |
| | ROW | COLUMN | ROW | COLUMN | ROW | COLUMN | ROW | COLUMN | ROW | COLUMN | ROW | COLUMN |
| 9 | — | — | MA18 | [NC0] | — | — | MA18 | [NC0] | — | — | MA18 | [NC0] |
| 8 | MAD9 | [NC1] | MAD9 | MAD8 | MAD9 | [NC1] | MAD9 | MAD8 | MAD9 | MAD9 | MAD9 | MAD8 |
| 7 | MAD8 | MAD7 | MA17 | MAD7 | MAD8 | MAD7 | MA17 | MAD7 | MAD8 | MAD8 | MA17 | MAD7 |
| 6 | MA16 | MAD6 | MA16 | MAD6 | MA16 | MAD6 | MA16 | MAD6 | MA16 | MAD6 | MA16 | MAD6 |
| 5 | MAD15 | MAD5 | MAD15 | MAD5 | MAD15 | MAD5 | MAD15 | MAD5 | MAD15 | MAD5 | MAD15 | MAD5 |
| 4 | MAD14 | MAD4 | MAD14 | MAD4 | MAD14 | MAD4 | MAD14 | MAD4 | MAD14 | MAD4 | MAD14 | MAD4 |
| 3 | MAD13 | MAD3 | MAD13 | MAD3 | MAD13 | MAD3 | MAD13 | MAD3 | MAD13 | MAD3 | MAD13 | MAD3 |
| 2 | MAD12 | MAD2 | MAD12 | MAD2 | MAD12 | MAD2 | MAD12 | MAD2 | MAD12 | [WC2] | MAD12 | [WC2] |
| 1 | MAD11 | MAD1 | MAD11 | MAD1 | MAD11 | MAD1 | MAD11 | MAD1 | MAD11 | [WC1] | MAD11 | [WC1] |
| 0 | MAD10 | MAD0 | MAD10 | MAD0 | MAD10 | [WC0] | MAD10 | [WC0] | MAD10 | [WC0] | MAD10 | [WC0] |

[ ] : COLUMN ADDRESS COUNTER

F I G. 29c

| FA | 1 ACCESSES / MCYC (DRAW) | | | | 4 ACCESSES / MCYC (DISPLAY) | | | |
|---|---|---|---|---|---|---|---|---|
| | 256K x 4-BIT (VMDO=0) | | 1M x 4-BIT (VMDO=1) | | 256K x 4-BIT (VMDO=0) | | 1M x 4-BIT (VMDO=1) | |
| | ROW | COLUMN | ROW | COLUMN | ROW | COLUMN | ROW | COLUMN |
| 9 | — | — | MA 18 | MAD 9 | — | — | MA 18 | MAD 9 |
| 8 | MAD 9 | MAD 8 | MA 19 | MAD 8 | MAD 9 | MAD 8 | MA 19 | MAD 8 |
| 7 | MA 17 | MAD 7 | MA 17 | MAD 7 | MA 17 | MAD 7 | MAD 17 | MAD 7 |
| 6 | MA 16 | MAD 6 | MA 16 | MAD 6 | MA 16 | MAD 6 | MA 16 | MAD 6 |
| 5 | MAD 15 | MAD 5 | MAD 15 | MAD 5 | MAD 15 | MAD 5 | MAD 15 | MAD 5 |
| 4 | MAD 14 | MAD 4 | MAD 14 | MAD 4 | MAD 14 | MAD 4 | MAD 14 | MAD 4 |
| 3 | MAD 13 | MAD 3 | MAD 13 | MAD 3 | MAD 13 | MAD 3 | MAD 13 | MAD 3 |
| 2 | MAD 12 | MAD 2 | MAD 12 | MAD 2 | MAD 12 | MAD 2 | MAD 12 | MAD 2 |
| 1 | MAD 11 | MAD 1 | MAD 11 | MAD 1 | MAD 11 | [WC 1] | MAD 11 | [WC 1] |
| 0 | MAD 10 | MAD 0 | MAD 10 | MAD 0 | MAD 10 | [WC 0] | MAD 10 | [WC 0] |

[ ] : COLUMN ADDRESS COUNTER

GRAPHIC PROCESSING APPARATUS UTILIZING IMPROVED DATA TRANSFER TO REDUCE MEMORY SIZE

BACKGROUND OF THE INVENTION

The present invention relates to a graphic processing apparatus for processing graphic data stored in a memory, and in particular, to a graphic processing apparatus in which the number of memories to be employed can be reduced so as to minimize the size of the processing apparatus.

For example, the Japanese Patent Publication JP-A-60-136793 describes a graphic processing apparatus in which characters and graphic data are generated in a display memory (frame buffer) so as to be delivered to output devices such as a display and a printer. In this conventional example, a high-speed graphic drawing operation is achieved by use of a method in which data bits constituting at least one pixel are packed in a word so as to be stored in the memory. In contrast with the prior method in which information of a pixel requires a plurality of words, this method allows accessing of the memory in the unit of a word (16 bits); in consequence, by packing information of a pixel in a single word, at least one pixel can be updated through one access, which therefore increases the processing speed.

In the conventional example above, although the memory is connected to a 16-bit data bus, the dynamic random access memory (DRAM) generally possesses a 1-bit or 4-bit data bus, and hence at least four to 16 memory elements are required, which prevents the apparatus from being miniturized.

In addition, the Japanese Patent Publication JP-A-60-225888 describes an apparatus including a dynamic random access memory (DRAM) having a nibble function (one of consecutive data read functions); however, description has not been given of a combination with a graphic processor in which data are accessed in a parallel fashion.

Moreover, in the Japenese Patent Publication JP-A-55-129387, there is described a system for transferring serial data between a processor and an external device; however, parallel data access is carried out between the processor and a memory.

SUMMARY OF THE INVENTION

It is therefore an object of the present invention to provide a small-sized graphic processing apparatus in which data transfer is enabled through a data bus having a reduced bit width so as to minimize the number of memory elements employed.

In order to achieve the object above, according to the present invention, there is disposed data converting means between processor means processing parallel data and a memory so as to enable the data bus width of the memory to be smaller than that of the processor means. The data converting means includes a latch for temporarily storing read data and a multiplexer for writing data. The present invention is characterized in that a memory having a successive data read function is applied to a processor effecting parallel data processing.

In the graphic processing apparatus according to the present invention, the memory is accessed in a time shared fashion such that data is converted by the converting means into parallel data. That is, in a data reading operation, data sequentially read out in a time shared fashion is temporarily stored in a latch so as to be supplied as parallel data to the processor. Moreover, in a data writing operation, parallel data supplied from the processor is sequentially written through the multiplexer into the memory in a time shared fashion.

BRIEF DESCRIPTION OF THE DRAWINGS

The present invention will be apparent from the following detailed description taken in conjunction with the accompanying drawings in which:

FIGS. 2, 3a, and 3b are diagrams for explaining a component of the embodiment of FIG. 1;

FIGS. 5a, 5b, and 5c are explanatory diagrams showing in detail the embodiment of FIG. 1;

FIGS. 8 to 14 are explanatory diagrams useful for explaining operation modes;

FIGS. 15a to 26 are detailed timing charts of the operation;

FIG. 28 is a diagram showing a gate circuit configuration; and

FIGS. 29a, 29b, and 29c are diagrams for explaining address outputs.

DESCRIPTION OF THE PREFERRED EMBODIMENTS

Figure 1:
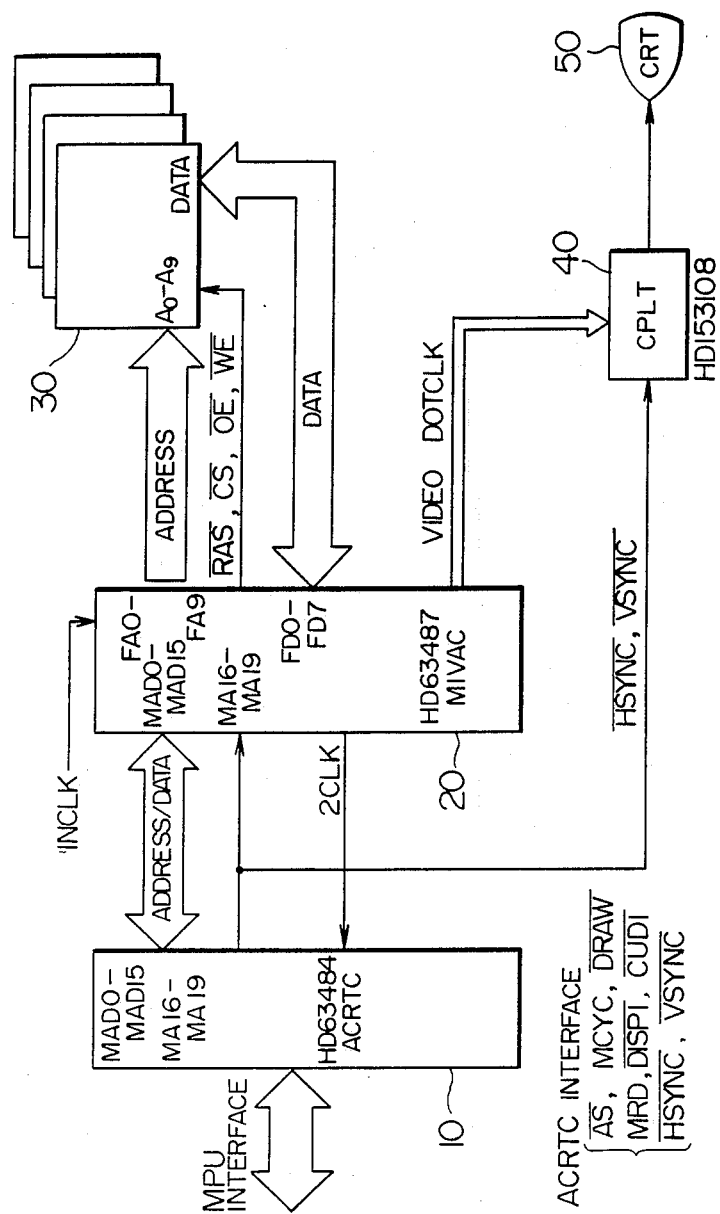
FIG. 1 is a schematic diagram showing an embodiment according to the present invention.

Referring now to the drawings, description will be given of an embodiment according to the present invention.

FIG. 1 shows a configuration of a graphic processing apparatus according to the present invention. The graphic processing apparatus includes a graphic processor, namely, Advanced Cathode Ray Tube (CRT) Controller (ACRTC, Hitachi HD63484) 10, a Memory Interface and Video Attribute Controller (MIVAC, Hitachi HD63487) 20, a frame buffer 30, a digital to analog converter with built-in color pallete (CPLT, Hitachi HD153108) 40, and a CRT 50. The MIVAC 20 produces various control signals and addresses necessary for the ACRTC 10 to access the frame buffer 30. The MIVAC 20 also generates 2CLK as a basic signal for the ACRTC 10. Furthermore, the MIVAC 20 has a function of converting parallel data from the frame buffer 30 into serial data for video signals.

On receiving control signals ($\overline{AS}$, MCYC $\overline{DRAW}$, MRD, etc.) from the ACRTC 10, the MIVAC 20 initiates the read and write operations on the frame buffer 30. In the operation, control signals including $\overline{RAS}$, $\overline{CS}$, $\overline{OE}$, and $\overline{WE}$ for the DRAM control are generated to be used in association with the frame buffer 30. In addition, an address received from the ACRTC 10 for the frame buffer 30 is multiplexed so as to produce row/column addresses. By use of the static column mode, the MIVAC 20 sequentially outputs a plurality of column addresses after a row address. In this embodiment, although the static column mode is adopted, it is also possible to use other sequential access mode (for example, a page mode, or a nibble mode) in combination therewith.

Read/write data is transferred between the ACRTC 10 and the frame buffer 30 through the MIVAC 20.

In the display operation, parallel data read from the frame buffer 30 is fetched into the MIVAC 20 to be converted into serial data by means of a parallel/serial converter integrated therein, thereby producing digital video signals. These digital video signals are converted by the CPLT 40 into analog video signals so as to be displayed on the CRT 50. In this embodiment, although the CRT 50 is used as the output device, other output equipment, such as a printer, may also be employed.

Figure 2:
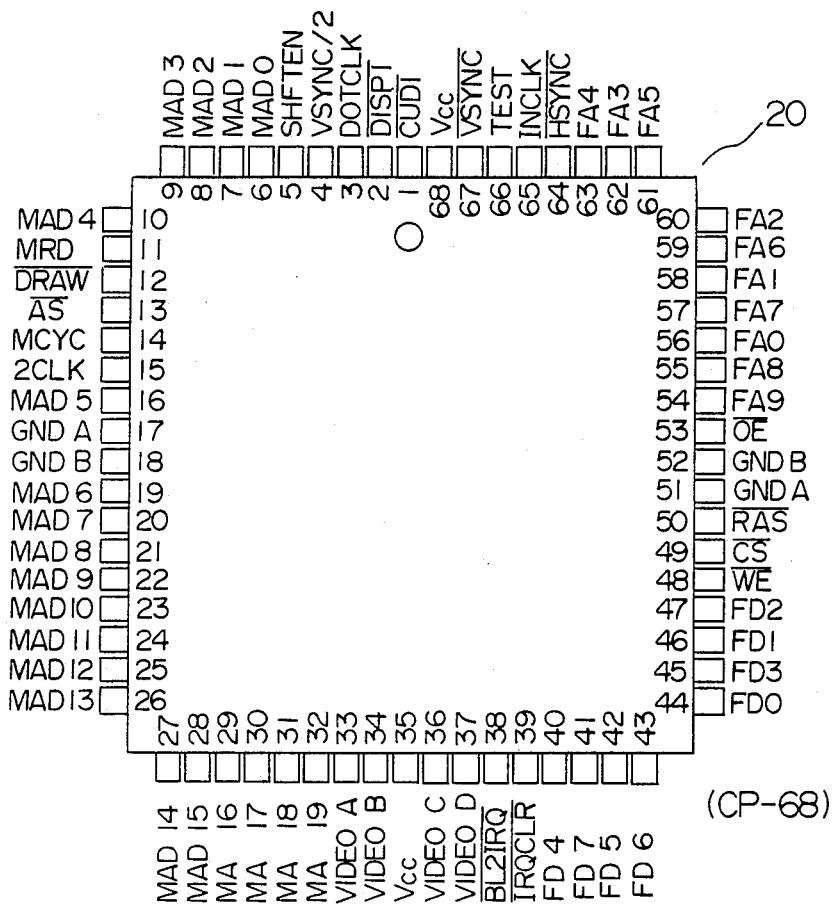

FIG. 2 shows the pin arrangement of the MIVAC 20. In this embodiment, the MIVAC 20 is manufactured by use of the High performance Bipolar CMOS (Hi-BiCMOS) technology in which the high-speed bipolar technology is combined with the technology of the CMOS of low power consumption, thereby implementing a high-speed and high-performance logic circuit of a relatively low power consumption. Since the MIVAC 20 includes a Plastic Leaded Chip Carrier (PLCC) 68-pin package, surface mounting thereof is possible, which enables the mounting board of the graphic processing apparatus to be minimized.

FIGS. 3a and 3b show various interface signals of the MIVAC 20. The input/output signals of the MIVAC 20 are briefly classified into operation control signals for controlling operations thereof, interface signals with respect to the ACRTC 10, interface signals for the frame buffer 30, and interface signals for the display 50.

Terminal INCLK of the operation control signals is used to receive a clock for the operation basis of the MIVAC 20. The interface signals for the ACRTC 10 include the 2CLK as the basic clock of the ACRTC 10, control signals MRD and $\overline{DRAW}$ for controlling the read and write operations, and signals on the address-/data buses MAD0 to MAD15 and address buses MA16 to MA19. The interface signals for the frame buffer 30 include $\overline{RAS}$, $\overline{CS}$, $\overline{OE}$, and $\overline{WE}$ as control signals of the DRAM and signals related to row/column address FA0 to FA9. The interface signals for the display 50 include digital video signals attained through parallel/serial conversion effected on display data and DOTCK produced by dividing INCLK.

Figure 4:
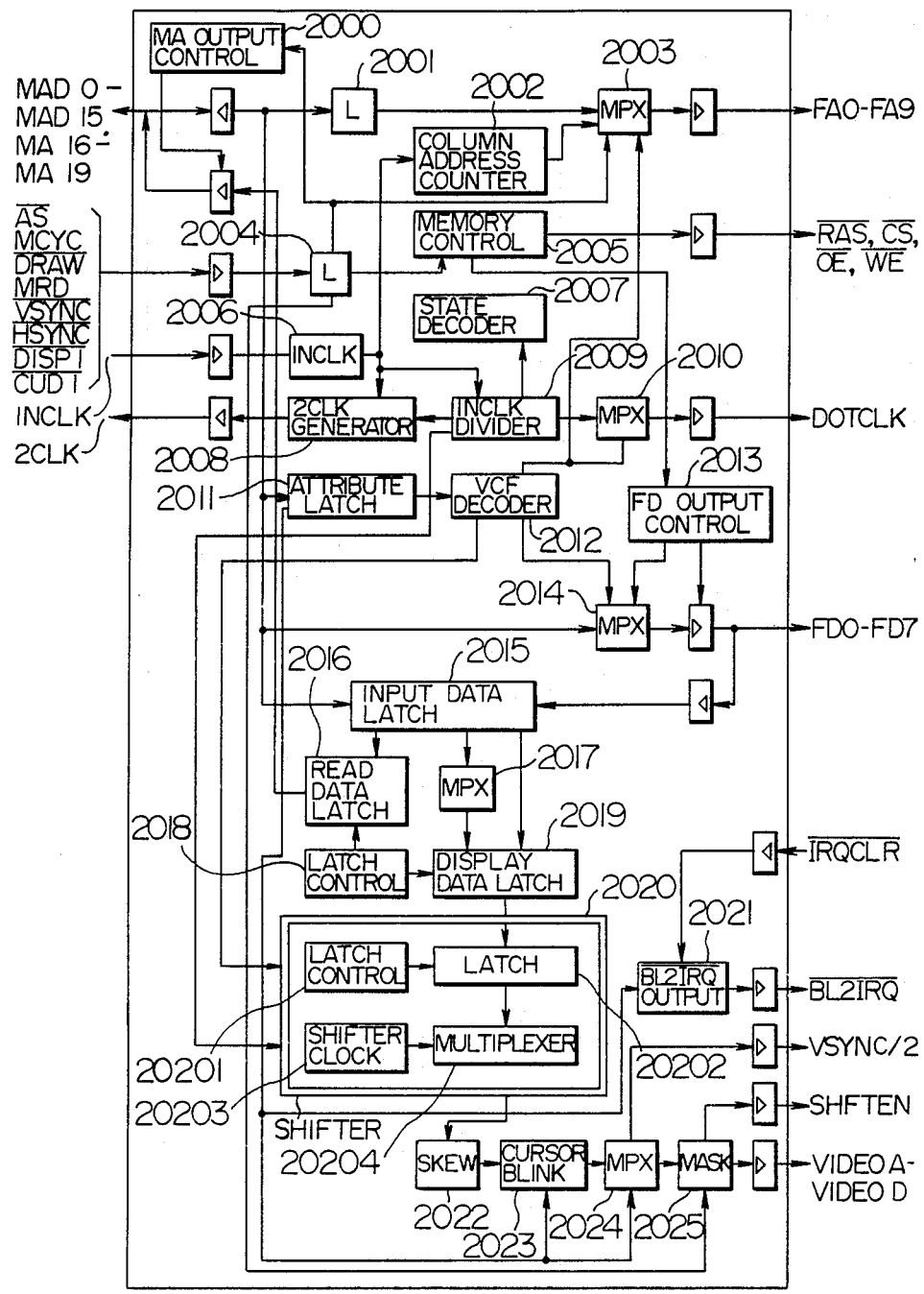
FIG. 4 is a diagram schematically showing an internal configuration of the component.

FIG. 4 shows an internal configuration of the MIVAC 20. In the MIVAC 20, an attribute code definable by the user stored in the ACRTC 10 is latched by means of an attribute code latch 2011 so as to be decoded by a VCF decoder 2012 into a signal, which enables various operation modes to be effected.

The INCLK as the basis of the operation of the MIVAC 20 is divided by 2, 4, 8 16, and 32 by INCLK 2006 and an INCLK divider 2009. The results are combined in a state decoder 2007 to generate a timing signal, which is used in the respective logic circuits.

The 2CLK as the basic clock of the ACRTC 10 is produced from a 2CLK generator 2008. In the 2CLK 2008, in order to effect a plurality of read and write operations in the memory cycle, the first half cycle is shorter than the second half cycle, i.e., this signal has an asymmetric shape.

For the DOTCLK, a multiplex operation is achieved on the signals attained by dividing INCLK by 1, 2, and 4 by means of a multiplexer 2010 to produce a multiplexed signal. Selection of the divided signals is automatically achieved depending on the operation mode of the MIVAC 20.

The frame buffer address MAD0 to MAD15 and MA16 to MA19 supplied from the ACRTC 10 is temporarily latched in a latch 2001 so as to be then multiplexed through a multiplexer 2003 into a row/column address, thereby generating a ten-bit address associated with the frame buffer address signals FA0 to FA9. In addition, there is integrated a column address counter 2002 such that the value of this counter and the latched address are multiplexed by the multiplexer 2003, so that the resultant signal is adopted as a portion of the column address, thereby effecting several read/write operations in a memory cycle.

The control signals from the ACRTC 10 are latched in a latch 2004. Depending on $\overline{DRAW}$ and MRD, the memory cycle is determined to be a draw read cycle, a draw write cycle, or a display cycle. When $\overline{DRAW}$ and MRD are respectively at low and high levels, namely, in the draw read cycle, the signals $\overline{RAS}$, $\overline{CS}$, and $\overline{OE}$, produced in the memory control 2005, are delivered so as to read drawing data from the memory. Data obtained through several read operations in a cycle is temporarily latched in an input data latch 2015 so as to be transferred therefrom to a read data latch 2016 to be latched again. The latched data is then outputted to the data buses MAD0 to MAD15 in accordance with the timing of the data fetch operation of the ACRTC 10 under control of the MA output control 2000.

In addition, when $\overline{DRAW}$ and MRD are both at a low level, namely, in the draw write cycle, the signals $\overline{RAS}$, $\overline{CS}$, and $\overline{WE}$, generated in the memory control 2005, are supplied so as to write drawing data in the memory. The drawing data to be written is multiplexed by a multiplexer 2014 disposed at an output stage including FD0 to FD7 in synchronism with the address which has undergone a counting operation by the column address counter 2002, so that the resultant multiplexed signals are written in the memory through several write operations effected at separate times under control of an FD output control 2013.

When $\overline{DRAW}$ and MRD are both at the high level, namely, in the display read cycle, the data obtained through several read operations in a cycle is latched by the input data latch 2015 used in the draw read cycle. Thereafter, the data is transferred to and is latched in a display data latch 2019. In a case of a 4-chip memory configuration, since data is supplied through MAD8 to MAD15, the data is multiplexed by a multiplexer 2017 so as to be transferred to the display data latch 2019. The data is then sent to a shifter 2020 and is latched by a latch 20202 in the shifter 2020 under the control of a latch control 20201. The latched data is multiplexed by a multiplexer 20204 in response to a clock signal produced from a shift clock generator 20203 so as to convert the parallel data into serial data, thereby generating 4-bit video signals.

The video signal is skewed by a skew circuit 2022 so as to be synchronized with the control signal from the ACRTC 10. For the video signal, a superimposing operation of a cursor can be achieved by use of a cursor blink 2023, or the video signals can be multiplexed through a multiplexer 2024 in response to a signal attained by dividing $\overline{VSYNC}$ by two. The video signal after having undergone these processing operations is finally masked by use of the $\overline{DISP}$ signal so as to be produced as a 4-bit digital video signal. The signal used for the video mask is delivered as SHFTEN. In addition, the signal attained by dividing $\overline{VSYNC}$ by two is produced as $\overline{VSYNC}/2$.

By using BLINK2 of the attribute codes, a $\overline{BL}$ 2IRQ/ output section 2021 generates $\overline{BL}$ 2IRQ/ . When BLINK2 is set to "1", "LOW" is supplied as the $\overline{BL}$ 2IRQ/ signal. When "Low" is inputted to the $\overline{IRQCLR}$ signal, the $\overline{\text{BL 2IRQ}}$/ signal turns to "High". The BLINK2 supplied from the ACRTC 10 outputs timing signals in which "1" and "0" are repeated for the predetermined number of fields.

FIGS. 5a, 5b, and 5c show connection methods for the frame buffers depending on the number of memories employed. In the case of a one chip memory configuration of FIG. 5a, four data terminals of FD0 to FD3 of the MIVAC 20 are connected to data terminals of a frame buffer 300. Terminals related to FD4 to FD7 are not used. In this case, 4-bit data is transferred at one time between the MIVAC 20 and the frame buffer 300. In the draw read cycle, the MIVAC 20 effects the 4-bit data read operation four times so as to transfer 16-bit data to the ACRTC 10. In the draw write cycle, 16-bit data from the ACRTC 10 is time-shared into four portions to be transferred to the frame buffer 300 through four transfer operations. In the display read cycle, 4-bit data is read four times in a memory cycle or 16 times in two memory cycles so as to be fetched as 16-bit and 64-bit display data items, respectively.

In the case of a two chip memory configuration of FIG. 5b, eight data terminals are used in association with FD0 to FD7 of the MIVAC 20. In operation, data terminals of the frame buffer 300 are connected to FD0 to FD3 and data terminals of the frame buffer 301 are linked to FD4 to FD7. Between the MIVAC 20 and the frame buffers 300 and 301, 8-bit data is transferred at one time. In the draw read cycle, the MIVAC 20 reads 8-bit data twice so as to supply 16-bit data to the ACRTC 10. In the draw write cycle, 16-bit data from the ACRTC 10 is time-shared to be supplied to the frame buffers 300 and 301 through two transfer operations. In the display read cycle, 8-bit data is read out four times in a memory cycle or 16 times in two memory cycles so as to fetch 32-bit and 128-bit display data times, respectively. As a consequence, the operation can be applied to a CRT which has a higher operation speed as compared with the case of FIG. 5a.

In the case of a four chip memory configuration of FIG. 5c, the connections of the frame buffers 300 and 301 are the same as for the case of the two chip configuration of FIG. 5b, the remaining two chips, namely, frame buffers 302 and 303 are connected to eight high-order bits of MAD8 to MAD15 selected from the data buses MAD0 to MAD15 between the ACRTC 10 and the MIVAC 20. In the draw read cycle, the MIVAC 20 read 16-bit data at a time. Eight-bit data read from the frame buffers 300 and 301 is outputted via the MIVAC 20 to MAD0 to MAD7. Data containing the eight high-order bits read from the frame buffers 302 and 303 is transferred, without using the MIVAC 20, directly via the buses MAD8 to MAD15 to the ACRTC 10. In the draw write cycle, data containing the eight low-order bits read from the ACRTC 10 is transferred through the MIVAC 20 via the buses MAD0 to MAD7 to FD0 to FD7. Data containing the eight high-order bits is transferred, without using the MIVAC 20, directly to the frame buffers 302 and 303. In the display read cycle, data containing eight low-order bits is read four times in a memory cycle via FD0 to FD7, whereas data containing eight high-order bits is read four times in a memory cycle via MAD8 to MAD15 such that the resultant 64-bit display data is fetched into the MIVAC 20. In the display cycle effected in the circuit connection of FIG. 5c, four addresses are outputted so as to execute four read operations as shown in FIG. 29c. Data including eight low-order bits and data including eight high-order bits are respectively sent via FD0 to FD7 and MAD8 to MAD15 to the input data latch 2015 (FIG. 4) so as to be latched therein. The input data latch 2015 is of a length of 64 bits and hence 16 bits ×4=64 bits are attained as display data.

In this mode, since the data buses are employed to input display data, it is impossible to effect a read operation in which 16 read operations are achieved in two memory cycles; however, when comparison is conducted in the read mode associated with four read operations per memory cycle, the operation above is applicable to a CRT which develops a higher processing speed as compared with the cases of FIGS. 5a and 5b.

Figure 6:
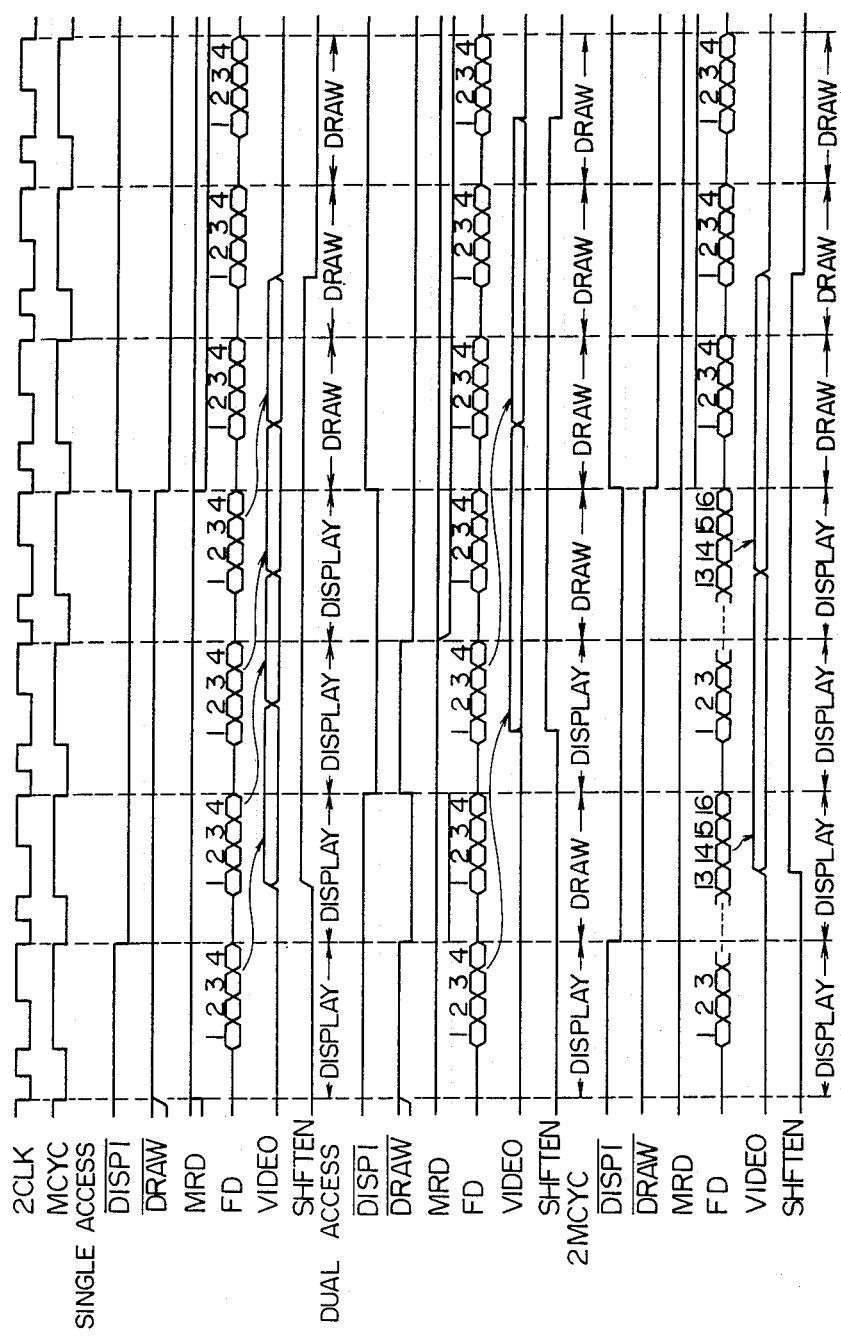
FIGS. 6 and 7 are diagrams for explaining the embodiment of FIG. 1.

FIG. 6 shows video output timings in the respective cycle modes. The ACRTC 10 has memory access modes including a single access mode in which the display cycle appears successively and a dual access mode in which high-speed drawing is possible. As shown in FIG. 6, in the single access mode, during a display period of time (where $\overline{\text{DISP}}$ is "Low"), the display cycle continues successively without effecting the drawing cycle. In contrast, in the dual access mode, also during the display period, the display cycle and the drawing cycle appear alternately. In the single access mode, the drawing cycle is restricted to be effected during the fly-back or retrace period, whereas in the dual access mode, the fly-back period and a half portion of the display period can be used as the drawing cycle, which enables the drawing operation to be accomplished at a higher speed. In the MIVAC 20, in addition to these access modes, there is a 2MCYC mode in which two display cycles of the single access mode are treated as a cycle so as to achieve 16 memory read operations. In the single access mode, data fetched in the first display cycle is displayed in the subsequent cycle. Data fetched in the second display cycle is displayed in the subsequent cycle. Thereafter, these operations are repeatedly achieved. Data obtained in the last display cycle is to be outputted in the next drawing cycle; however, since the $\overline{\text{DISP}}$ signal of the ACRTC 10 is supplied only during the display cycle period, the end portion of $\overline{\text{DISP}}$ is elongated by a cycle in the MIVAC 20 so as to use the signal as a mask signal. In the dual access mode, data of the first display cycle is delivered through two subsequent cycles. As a consequence, the end portion of $\overline{\text{DISP}}$ is elongated by two cycles so as to produce a mask signal. In the 2MCYC mode, 16 data read operations are achieved in two cycles, and the video output is also supplied through two cycles.

Figure 7:
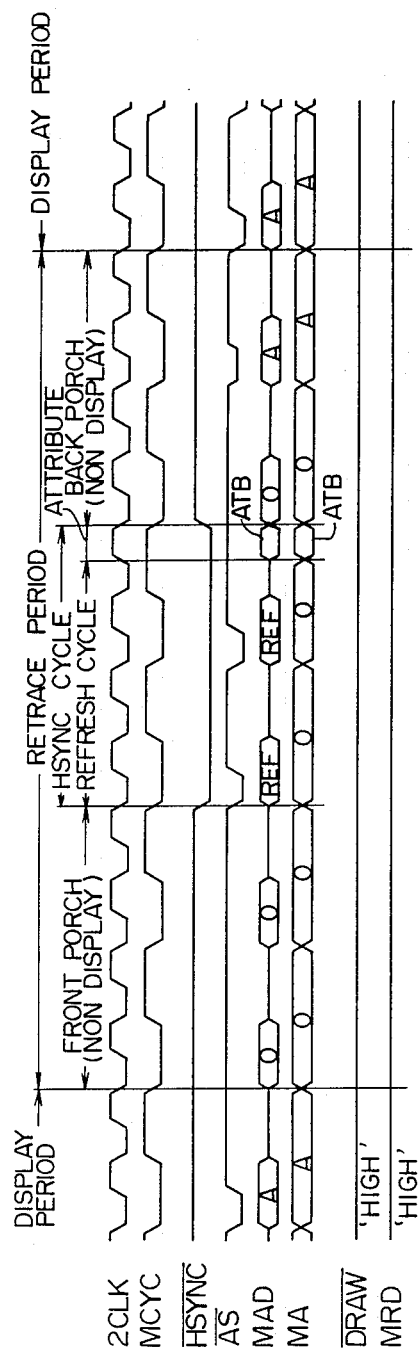

FIG. 7 shows the output timing of the attribute codes delivered from the ACRTC 10. The attribute codes are information items arbitrarily defined by the user. The attribute code is fed to MAD0 to MAD15 and MA16 to MA19 of the ACRTC 10 while 2CLK and MCYC are both at the high level during the last refresh period. When the attribute code is fetched and is then decoded, the operation mode of the MIVAC 20 is set.

Figure 8:
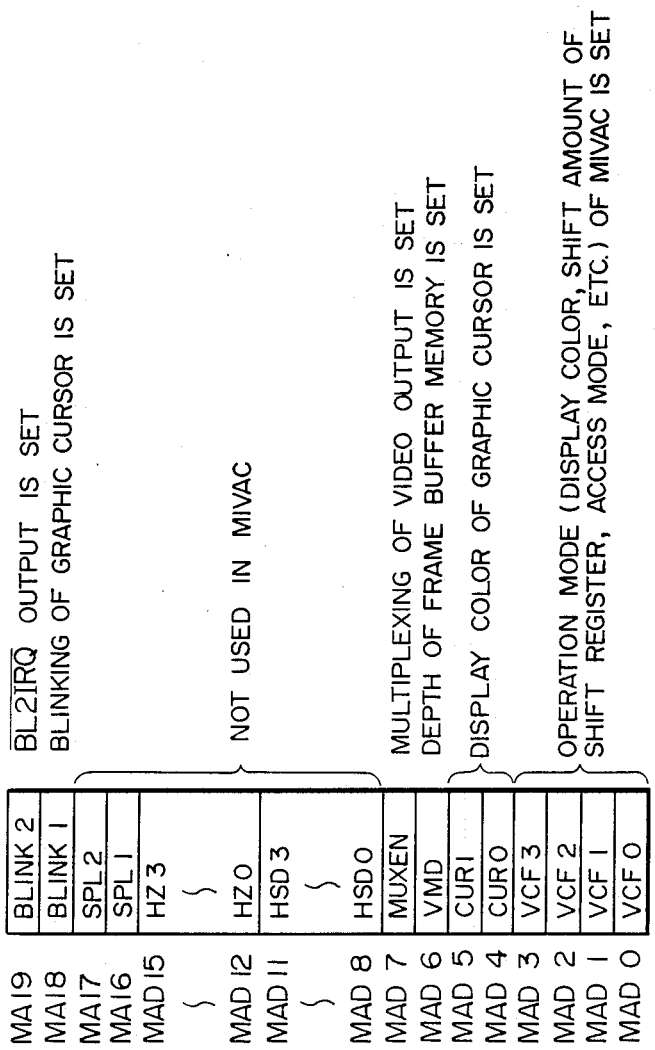

FIG. 8 shows the setting of attribute codes in the MIVAC 20. The MIVAC 20 uses MAD0 to MAD7, which are freely defined by the user, and MA18 and MA19, usages of which are predetermined for the ACRTC 10. Four bits of MAD0 to MAD3 are used to set the display color, the shift amount of the shift register, the access mode, the number of memories employed, and the division ratio of the DOTCLK. MAD4 and MAD5 are used to set the display color of the cursor. MAD6 sets the depth of the memory employed. MAD7 sets whether or not the video output is multiplexed. MA18 is used to set the blinking operation of the cursor. MA19 sets the $\overline{BR}$ 2IRQ/ output.

FIG. 9 shows 16 operation modes defined by the four bits MAD0 to MAD3 of FIG. 8. The display color, the shift amount of the shift register, the access mode, the number of memories employed, and the division ratio of the DOTCLK are automatically determined by setting one of the 16 operation modes.

(1) For the display color (color/gradation), there can be specified a monochrome display represented by 1 bit/pixel, a four-color display expressed by 2 bits/pixel, and 16-color display represented by 4 bits per pixel. In the case of 1 bit/pixel, a word of the memory is loaded with information of 16 consecutive pixels in the horizontal direction. In the case of 2 bits/pixel, a word of the memory is loaded with information of 8 consecutive pixels in the horizontal direction, and in the case of 4 bits/pixel, a word of the memory is loaded with information of 4 consecutive pixels in the horizontal direction.

(2) The shift length of the shift register may be set to 4, 8, 16, or 32 bits.

(3) The access modes include a single access mode, a dual access mode in which high-speed drawing is possible, and a 2MCYC mode in which 16 display accesses are conducted in two memory cycles. In the modes 0 to 5, the single access mode is employed, whereas in the modes 6 to C, the dual access mode is used. In the modes D to F, the 2MCYC mode is adopted.

(4) The number of memories selectable is 1, 2, or 4. For the memory, there is utilized a memory such as one having a static column mode in which a plurality of read/write operations can be accomplished in a cycle.

(5) DOTCLK is generated by dividing INCLK by 1, 2, and 4. The division ratios are determined according to the respective operation modes. Based on the frequency, the screen layout of the CRT is determined for each operation mode.

FIG. 10 shows frequencies of DOTCLK applicable to the respective operation modes. In the modes 0, 3, 5, 8, B, D, and F, the division ratio is one, that is, the output of DOTCLK is identical to INCLK. In the modes 1, 4, 6, 9, C, and E, the division ratio is two; whereas in the modes 2, 7, and A, the division ratio is 4 for the DOTCLK output.

FIG. 11 shows cursor display colors set by use of MAD4 (CUR0) and MAD5 (CUR1).
(1) When CUR1 and CUR0 are both 0
The four bits of video outputs VIDEOA to VIDEOD are set to 0, and hence a black cursor is displayed.
(2) When CUR1 is 0 and CUR0 is 1
The four bits of video outputs VIDEOA to VIDEOD are set to 1 and hence a white cursor is displayed.
(3) When CUR1 is 1 and CUR0 is 0
For the four bits of video outputs VIDEOA to VIDEOD, the respective colors are reversed on the display.
(4) When CUR1 and CUR0 are both 1
For the three bits of video outputs VIDEOA to VIDEOC, the respective colors are reversed on the display, whereas VIDEOD is kept unchanged.

FIG. 12 shows depths t be specified by MAD6 (VMD) for the memory elements employed. For VMD =0, the depth is set to 256 k×4 bits; for VMD =1, the depth is set to 1 M×4 bits for the memory.

FIG. 13 shows the settings of MAD7 (MUXEN) specifying whether the video outputs are to be multiplexed or not. When MUXEN is 0, the multiplex operation is not achieved. When MUXEN is 1 and VSYNC/2 is 0, the video outputs are not multiplexed. When MUXEN and VSYNC/2 are both 1, data of VIDEOC is delivered as VIDEOA and data of VODEOD is supplied as VIDEOB. This function is primarily adopted for a display equipment using a color shutter.

FIG. 14 shows the setting of MA18 (BLINK1) for the graphic cursor display. In the case of BLINK1=0, the cursor is not displayed, whereas for BLINK1=1, the cursor is displayed.

FIGS. 15a to 26 shows detailed timing charts in the respective operation states.

Figure 15A:
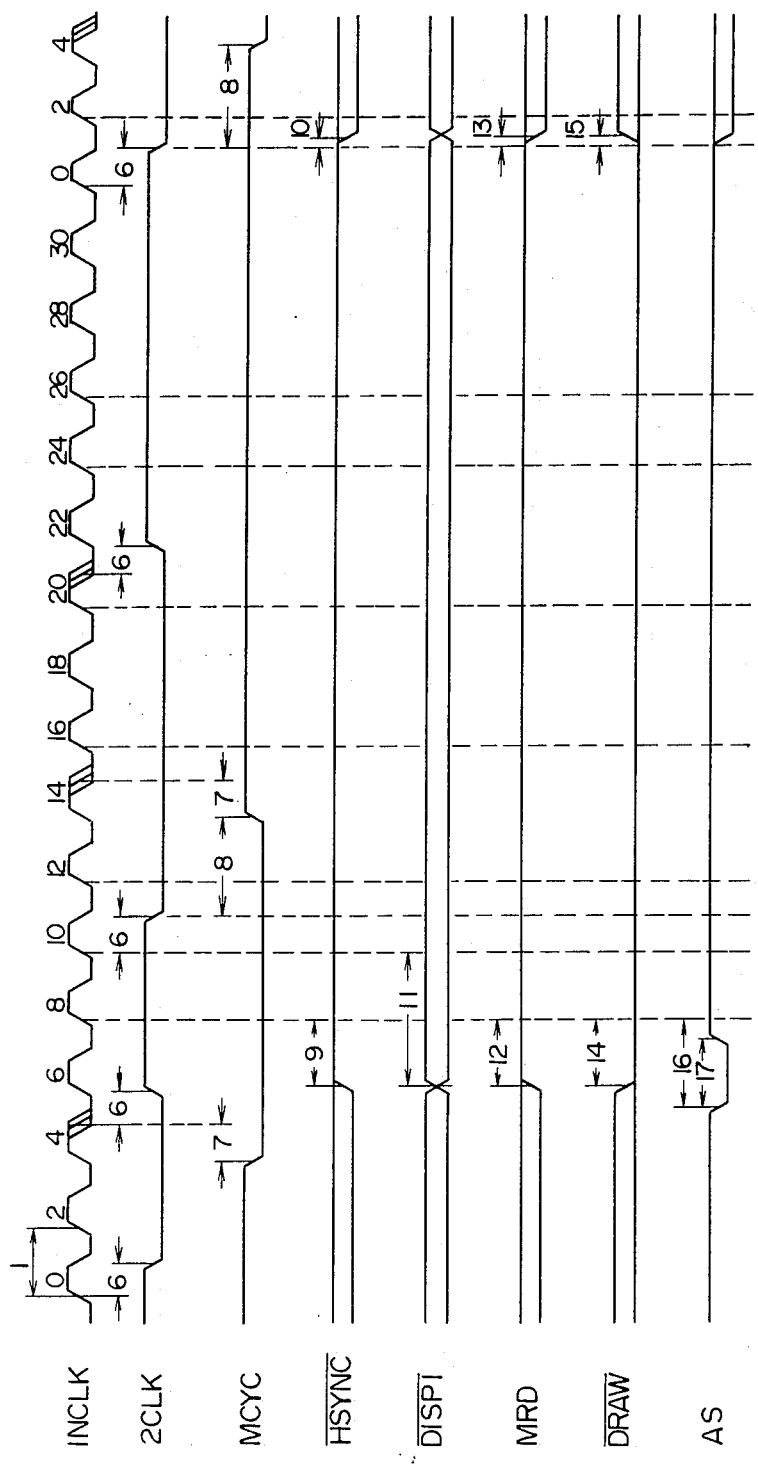
Figure 15B:
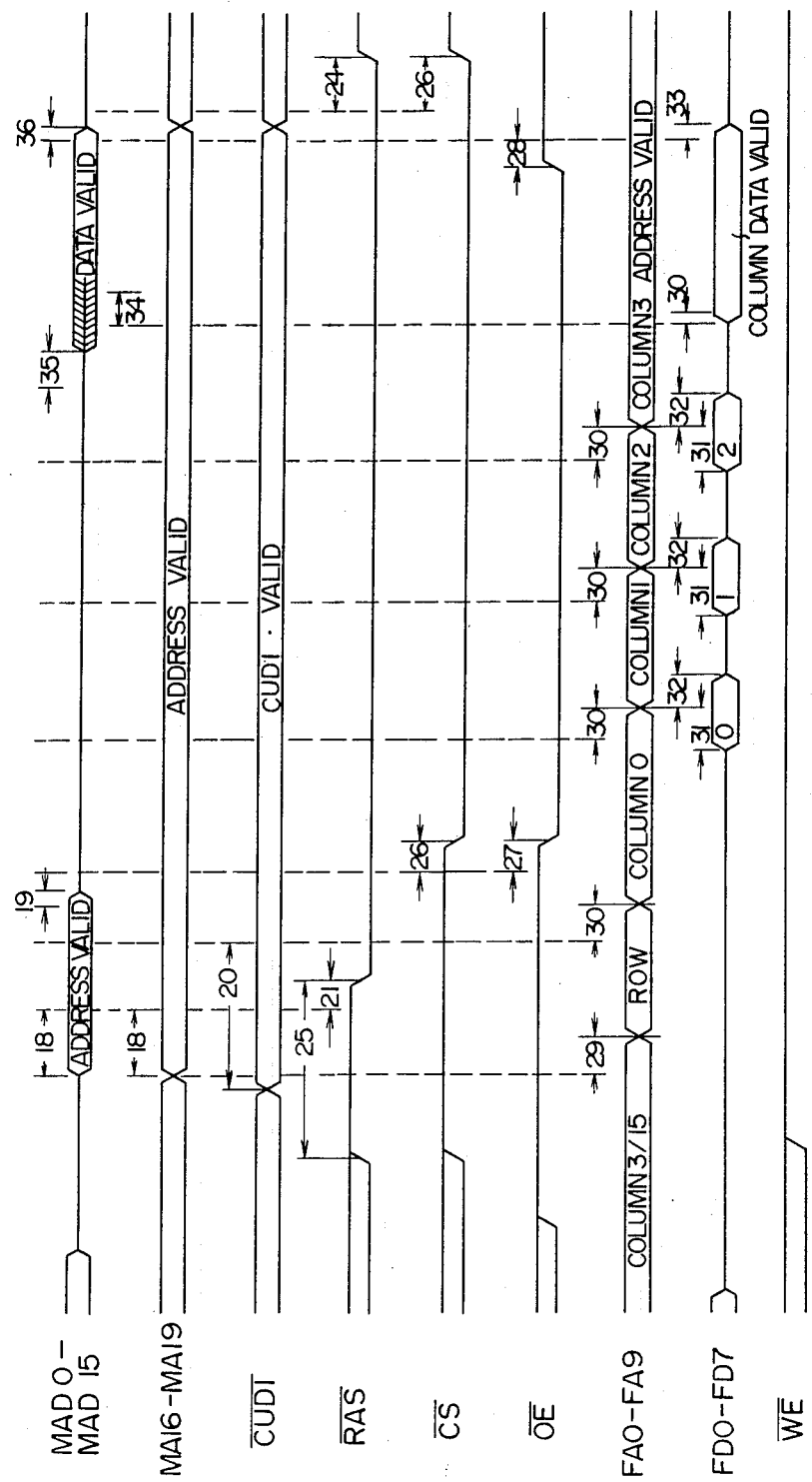

FIGS. 15a and 15b show in detail timing of the draw read cycle in the case where one memory is employed.

Figure 16A:
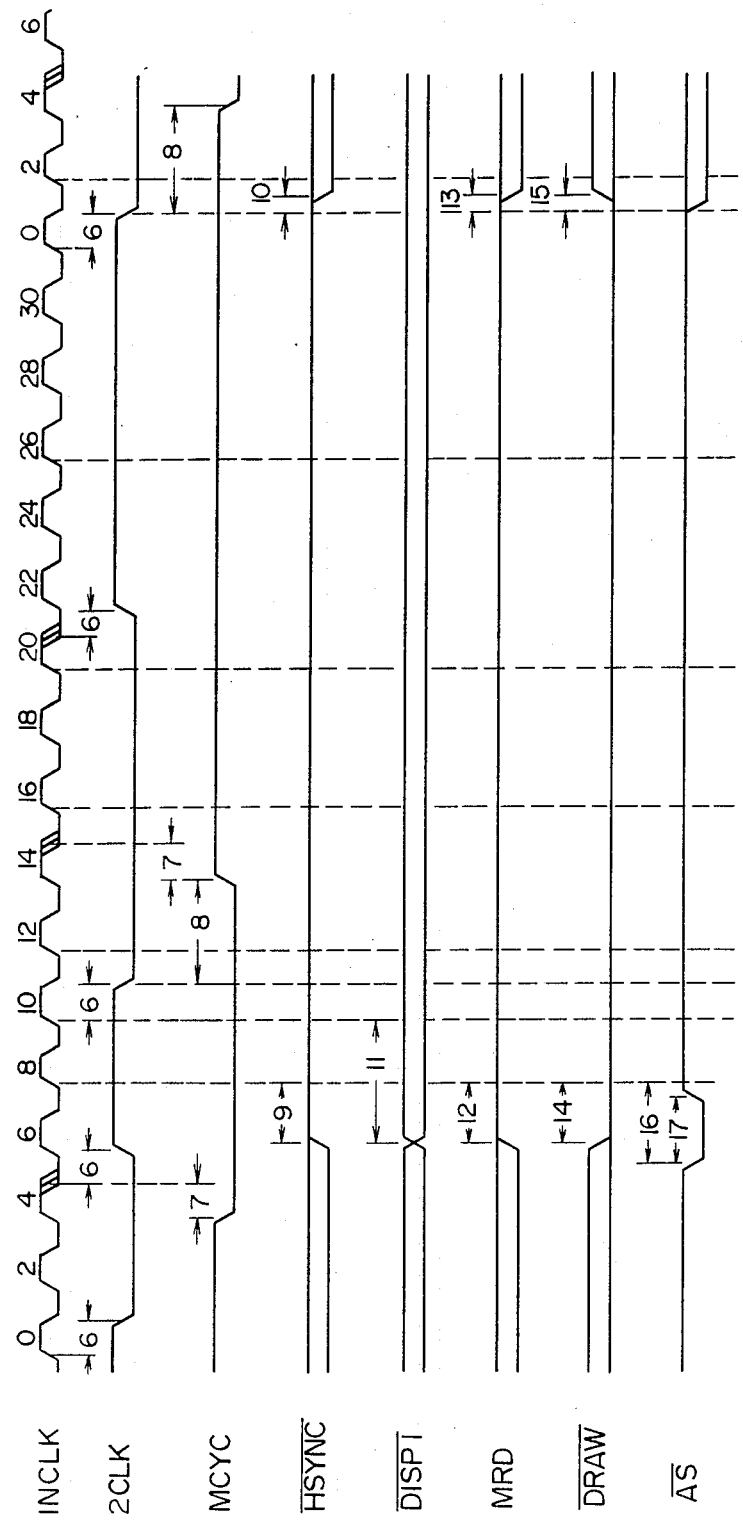
Figure 16B:
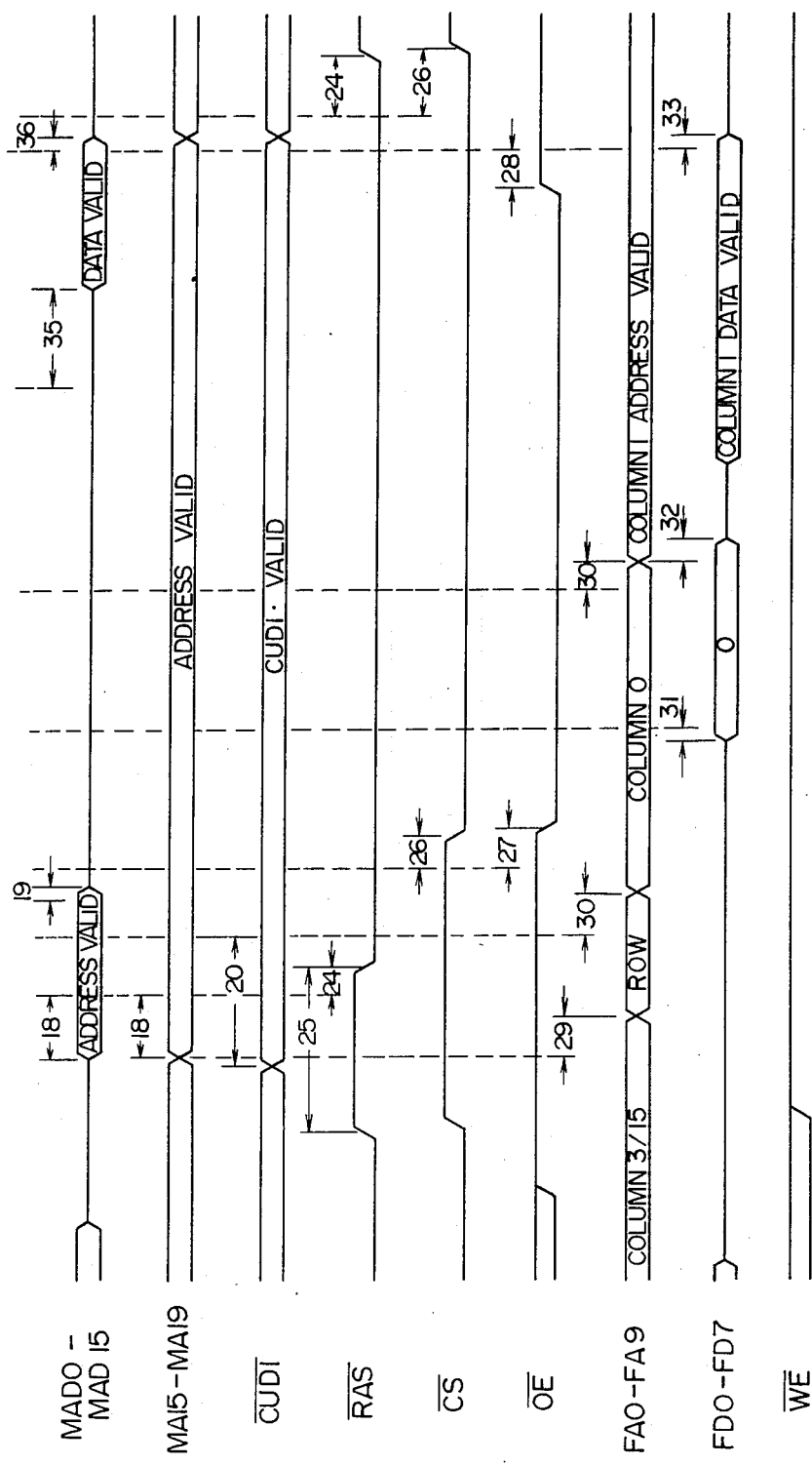

FIGS. 16a and 16b show in detail timing of the draw read cycle in the case where two memories are employed.

Figure 17A:
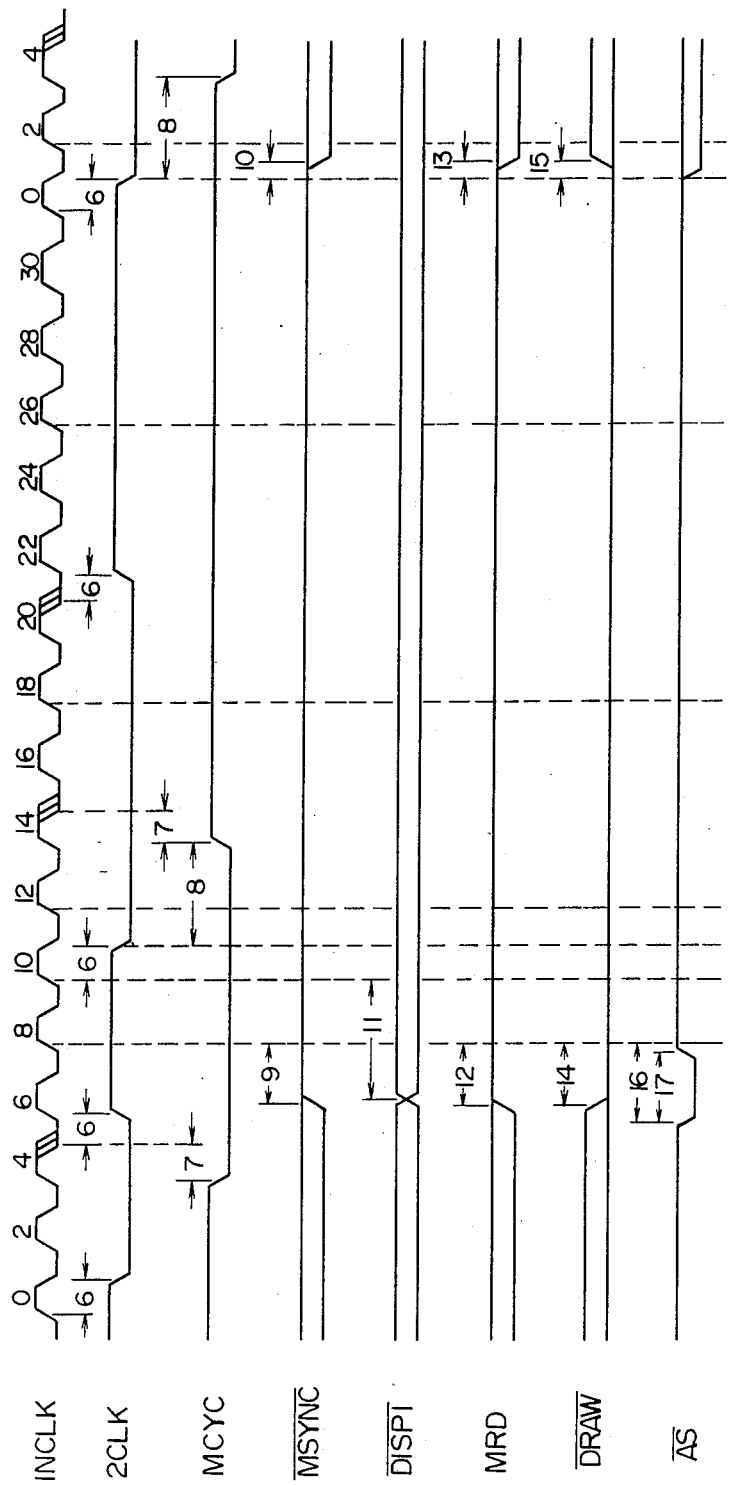
Figure 17B:
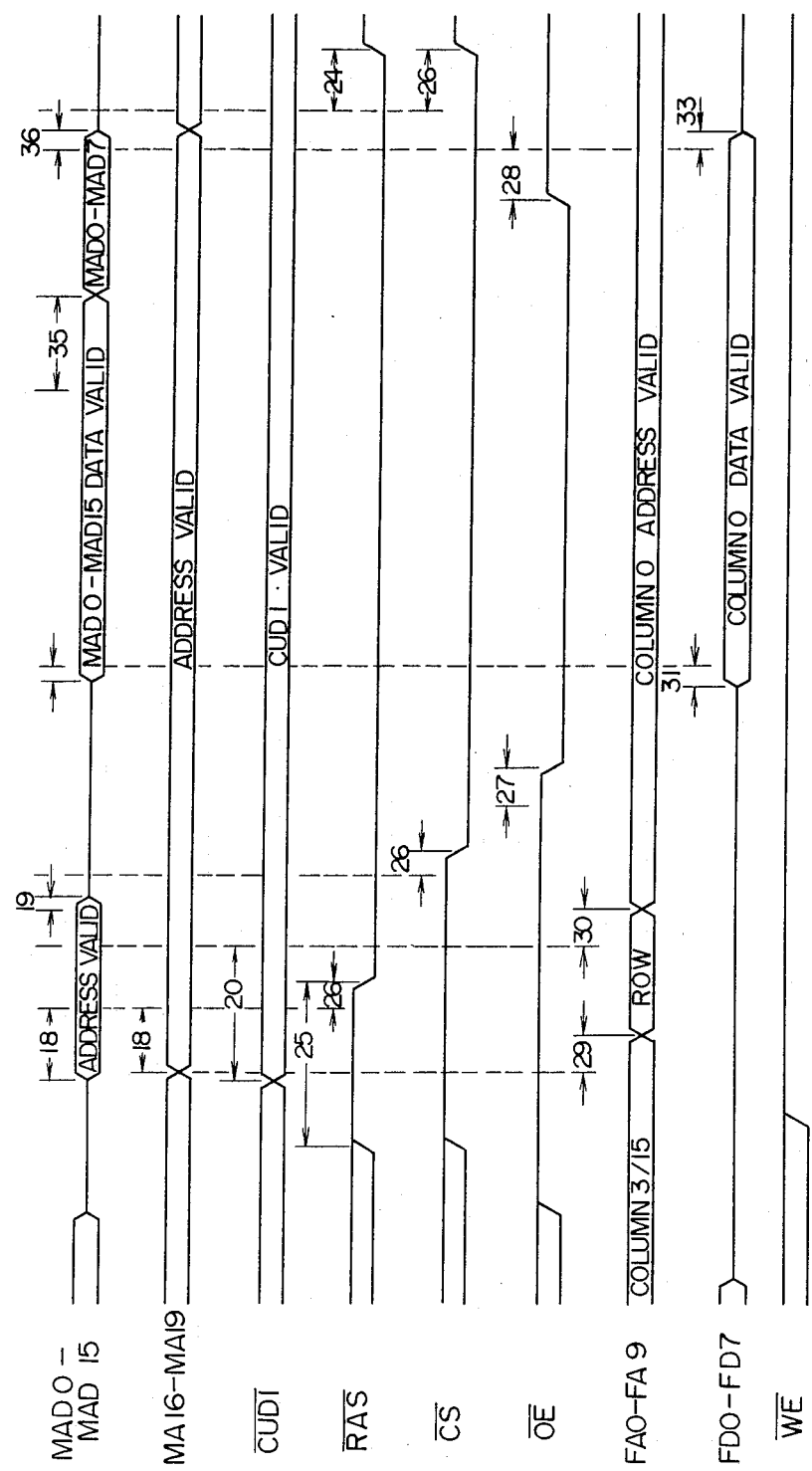

FIGS. 17a and 17b show in detail timings of the draw read cycle in the case where four memories are employed.

Figure 18A:
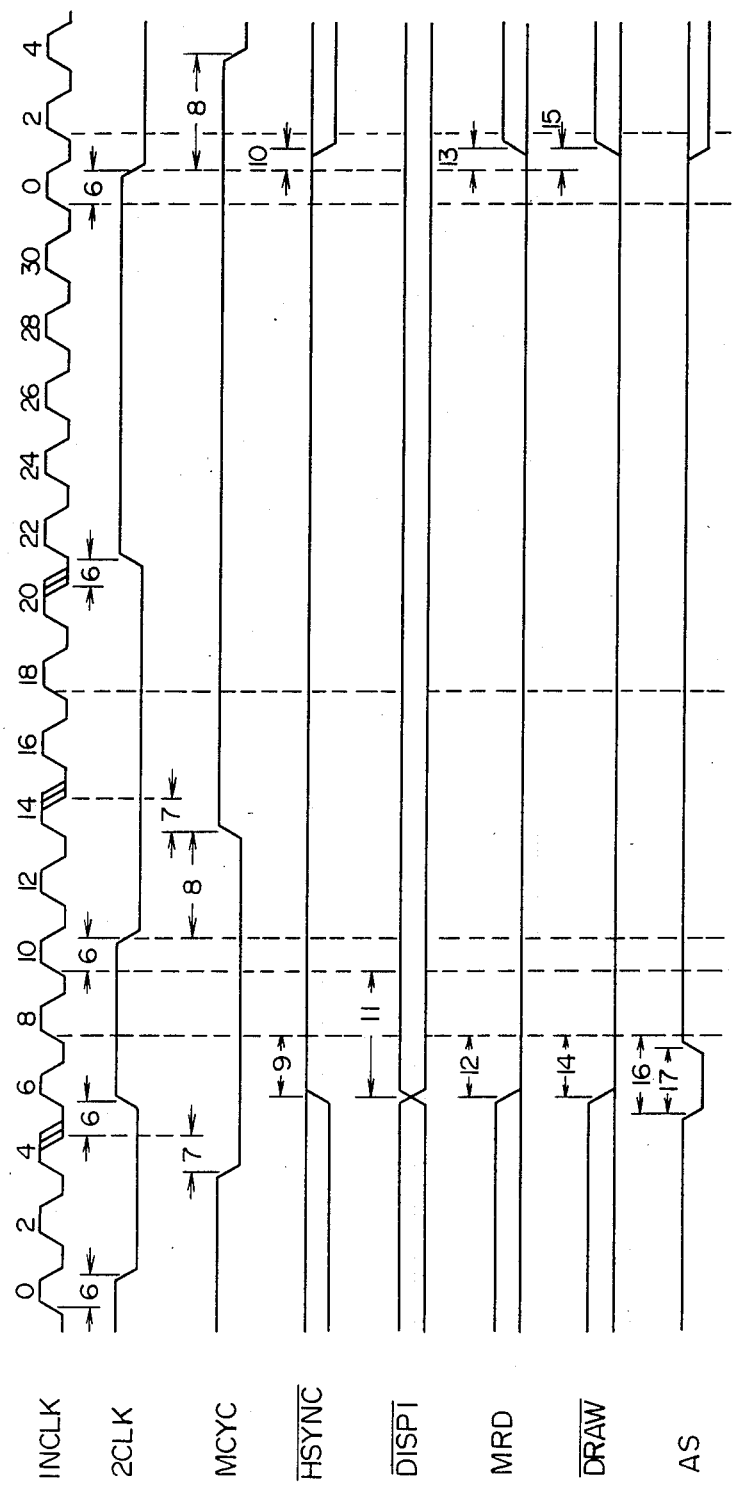

FIGS. 18a and 18b show in detail timing of the draw write cycle in the case where one memory is employed.

FIGS. 19a and 19b show in detail timing of the draw write cycle in the case where two memories are employed.

Figure 20A:
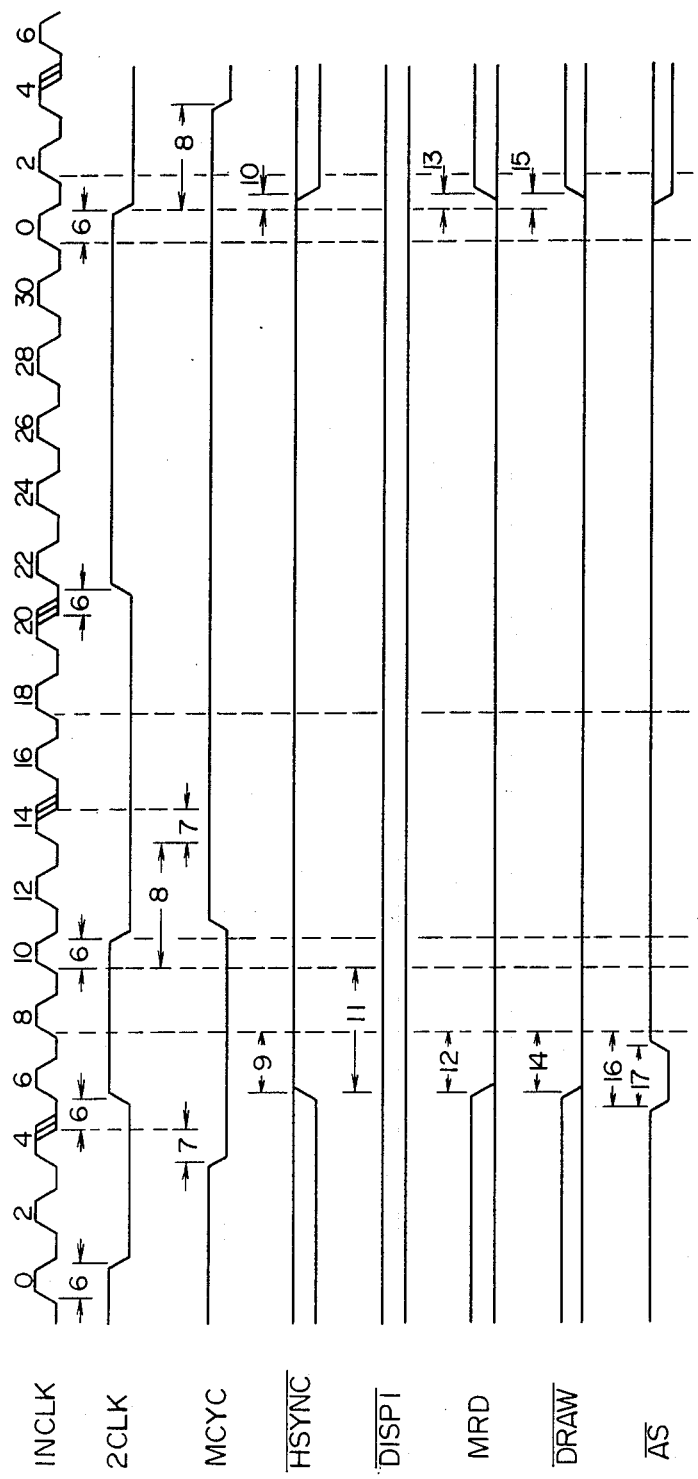

FIGS. 20a and 20b show in detail timing of the draw write cycle in the case where four memories are employed.

Figure 21A:
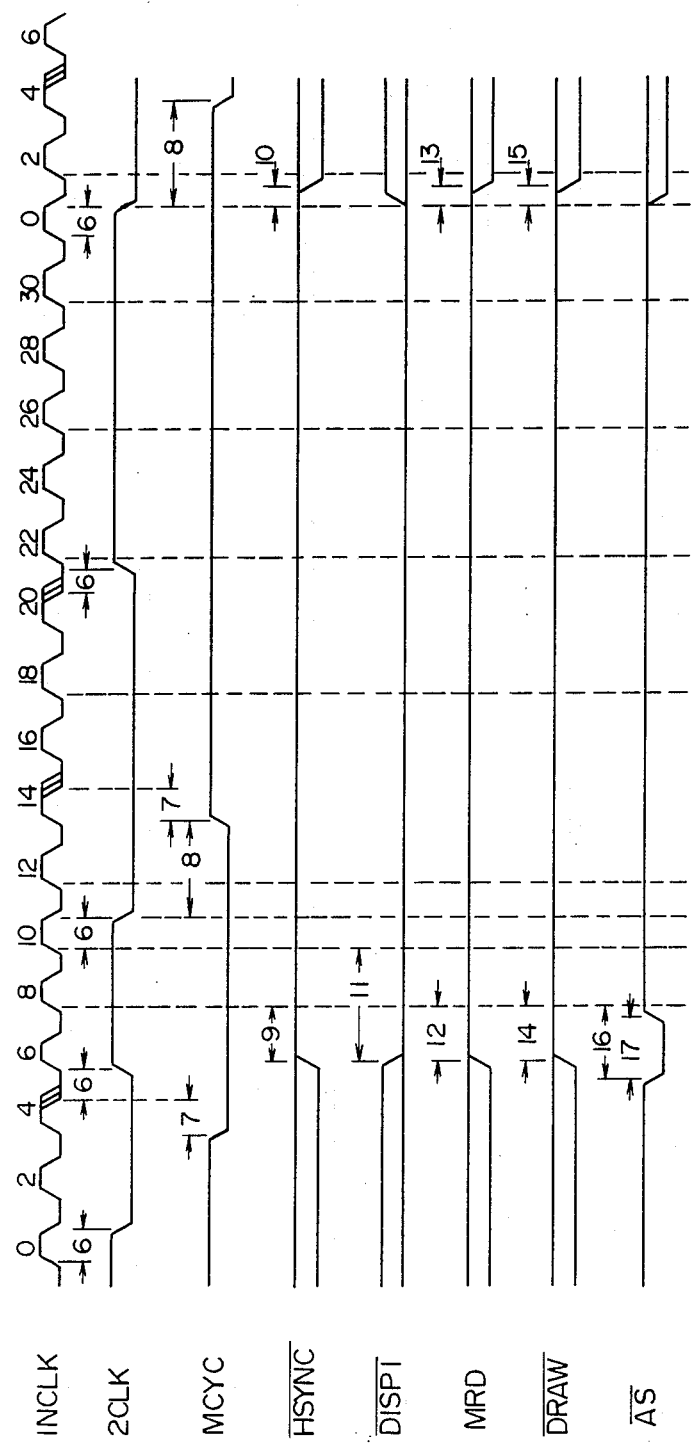

FIGS. 21a and 21b show in detail timing of the display read cycle in the case where a memory or two memories are employed.

Figure 22A:
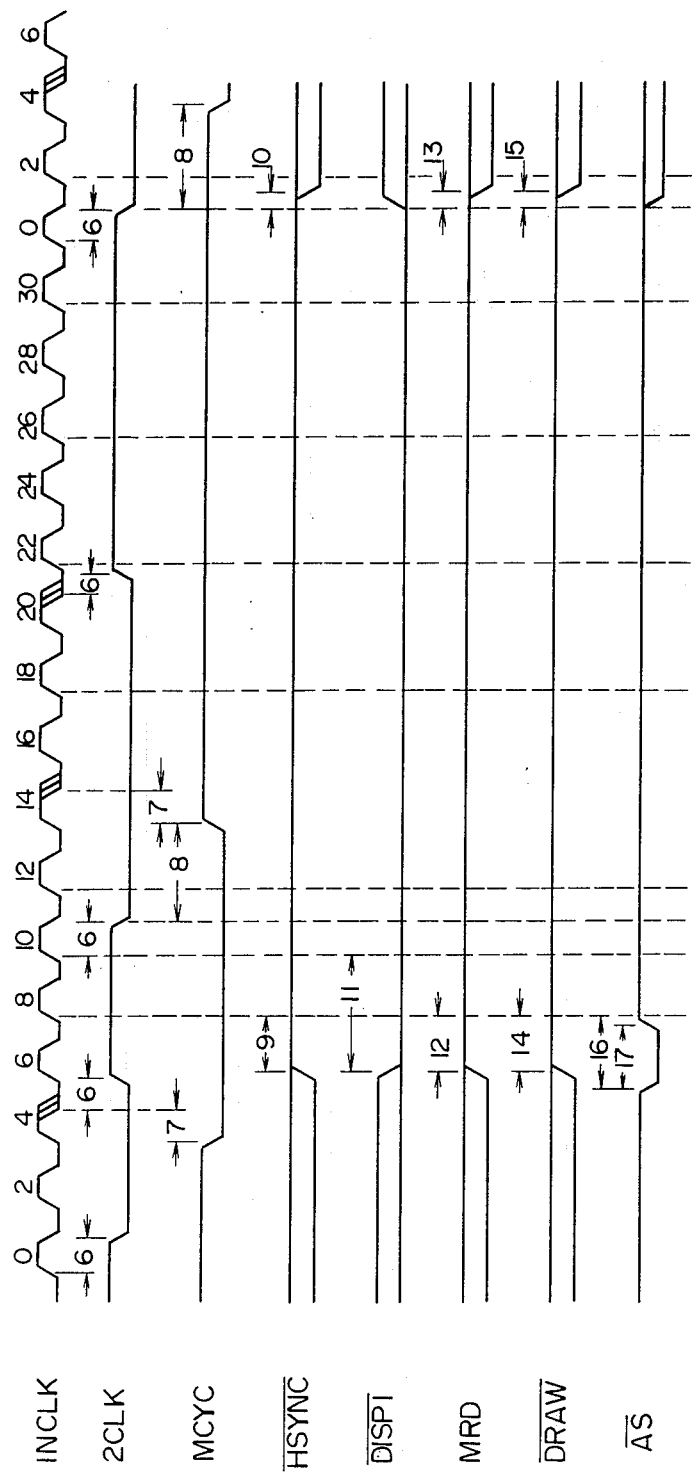
Figure 22B:
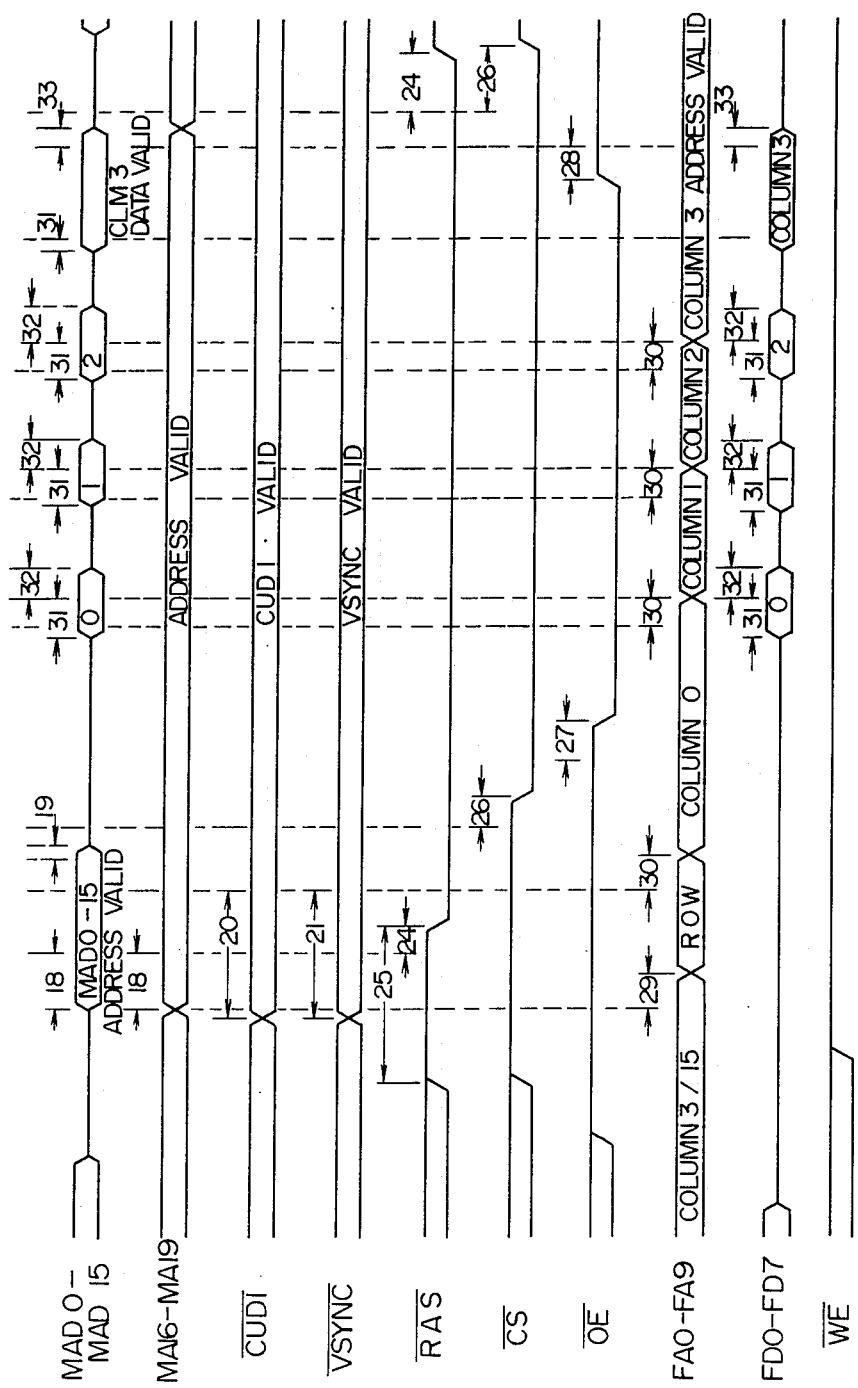

FIGS. 22a and 22b show in detail timing of the display read cycle in the case where four memories are employed.

Figure 23A:
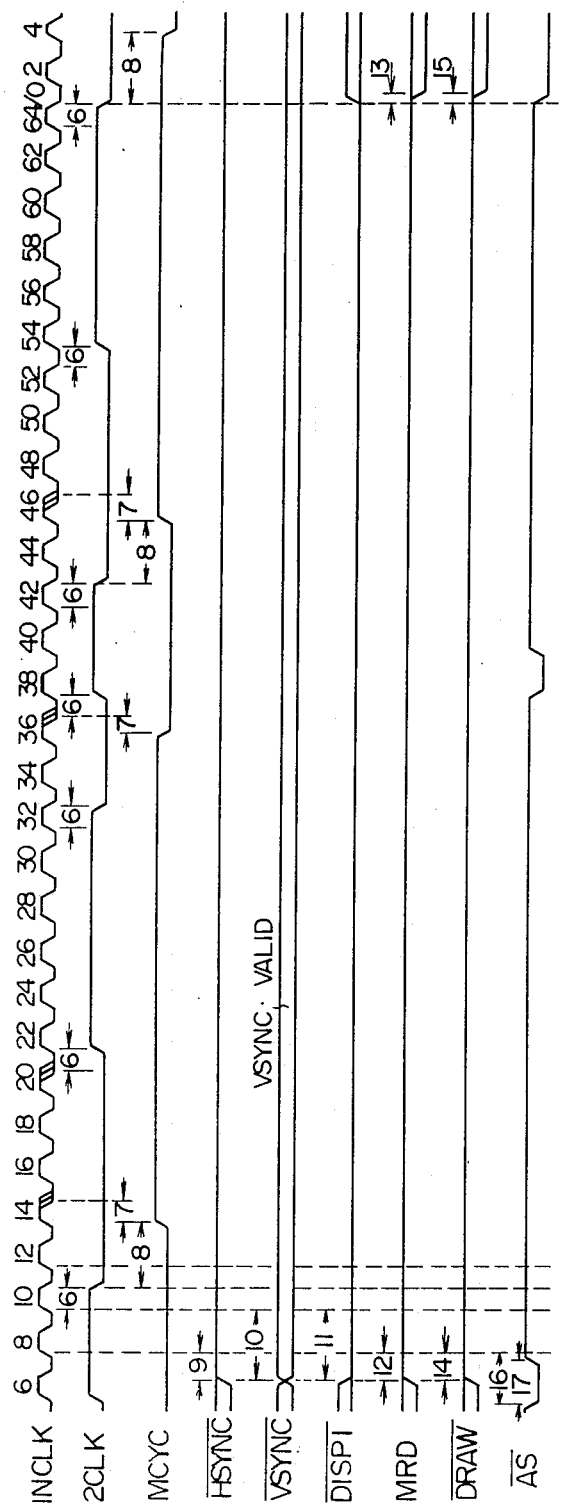
Figure 23B:
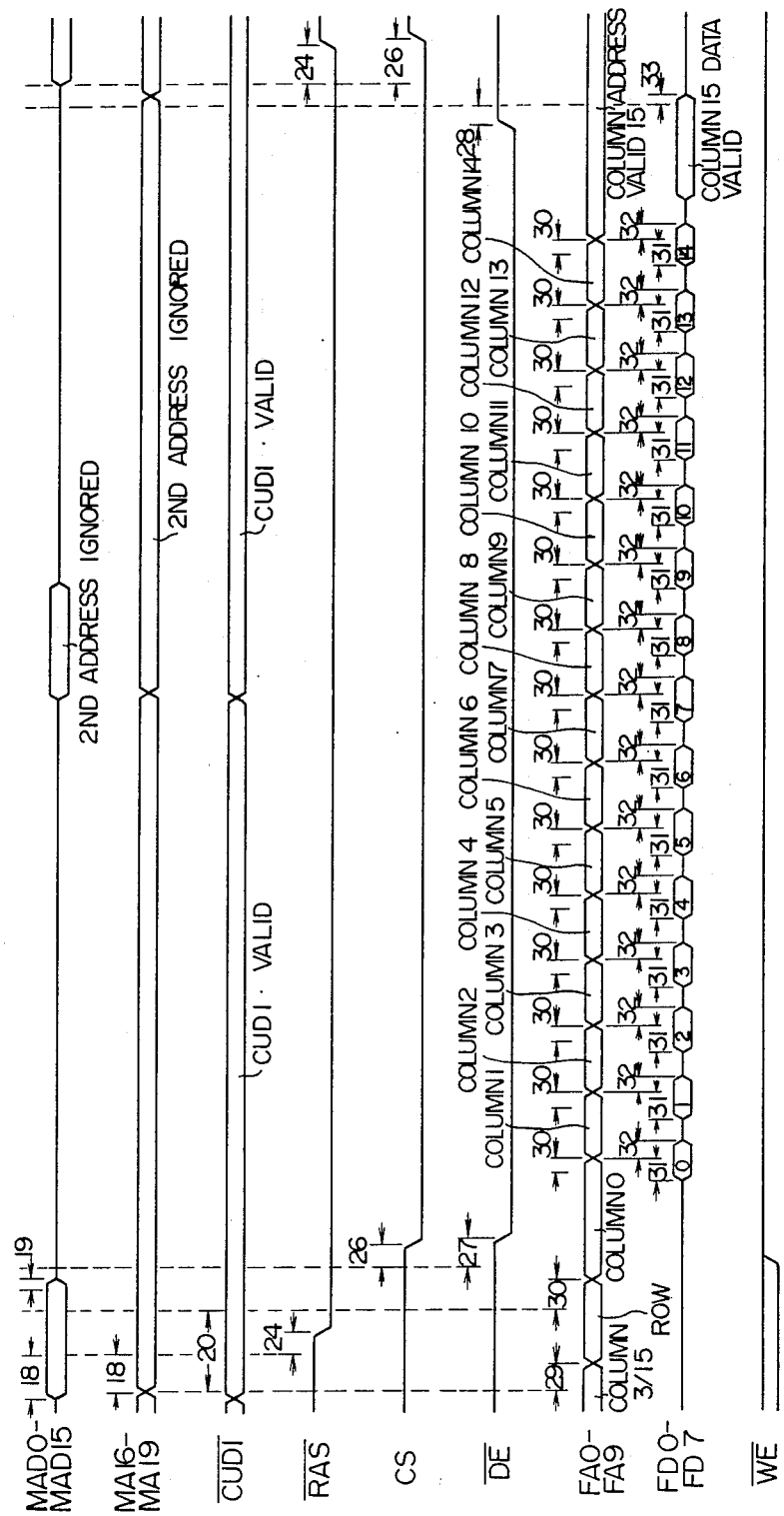

FIGS. 23a and 23b show in detail timing of the display read cycle in the 2MCYC mode in the case where one memory or two memories are employed.

Figure 24A:
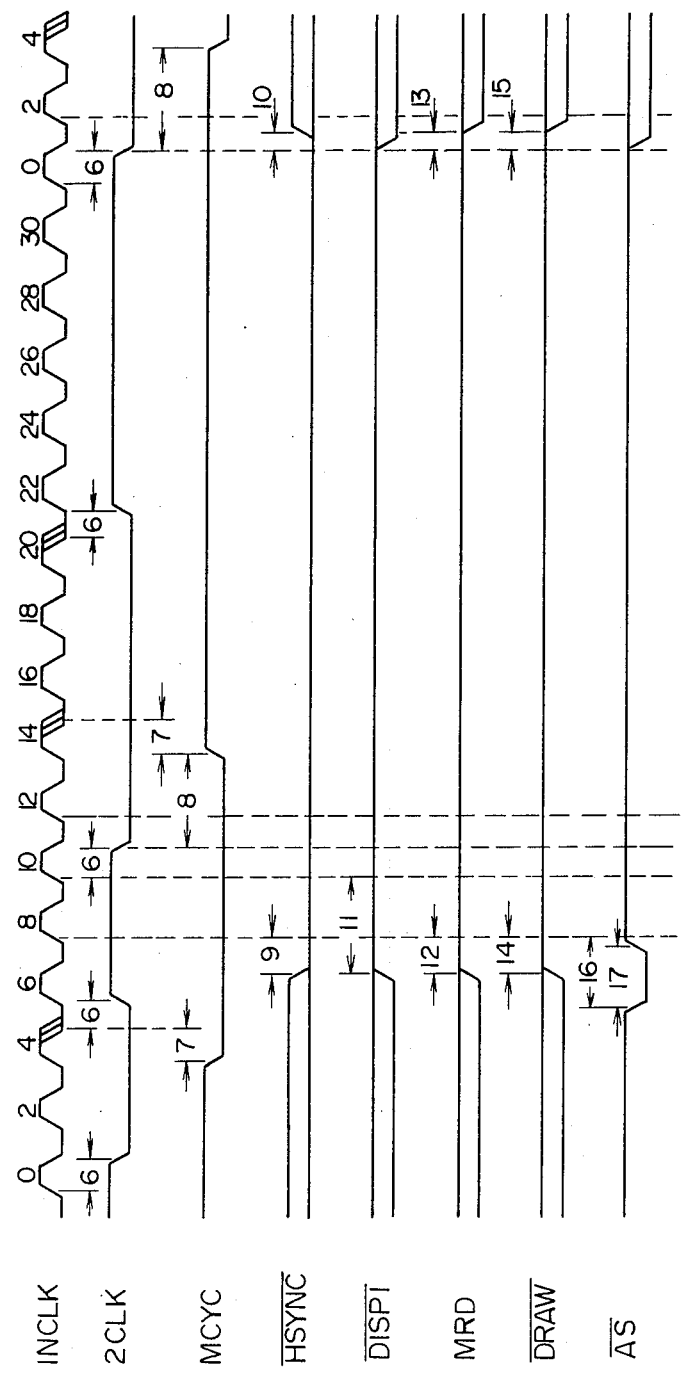

FIGS. 24a and 24b show in detail timing of the $\overline{CS}$ before $\overline{RAS}$ refresh cycle of the DRAM. The refresh operation is executed in a period where the horizontal synchronization signal HSYNC is at the low level.

Figure 25:
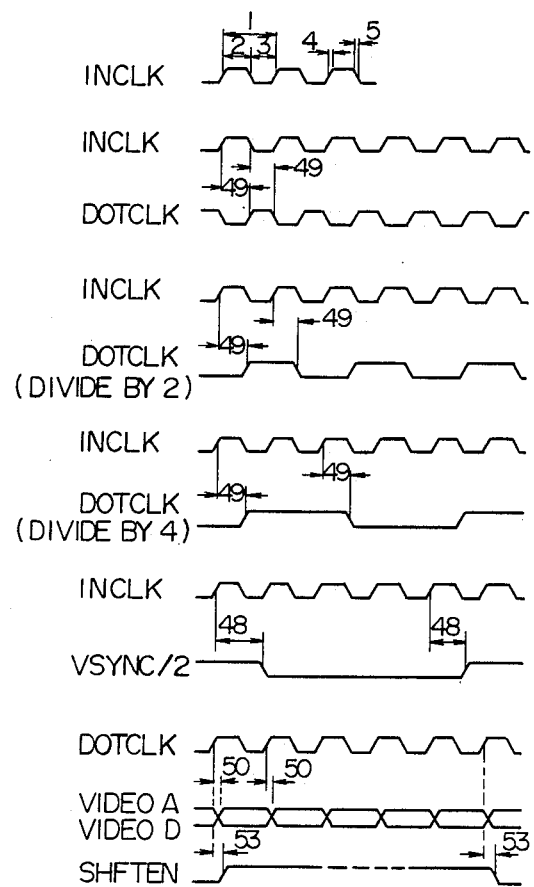

FIG. 25 shows in detail the output timing, for the division ratios 1, 2, and 4, of DOTCLK, VSYNC/2, VIDEOA to VIDEOD, and $\overline{SHFTEN}$.

Figure 26:
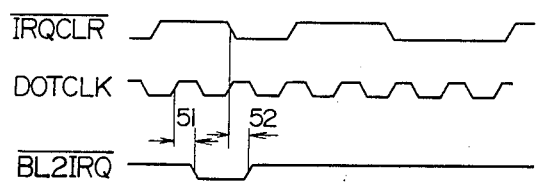

FIG. 26 shows in detail output timings of $\overline{BL}$ 2IRQ/.

Figure 27:
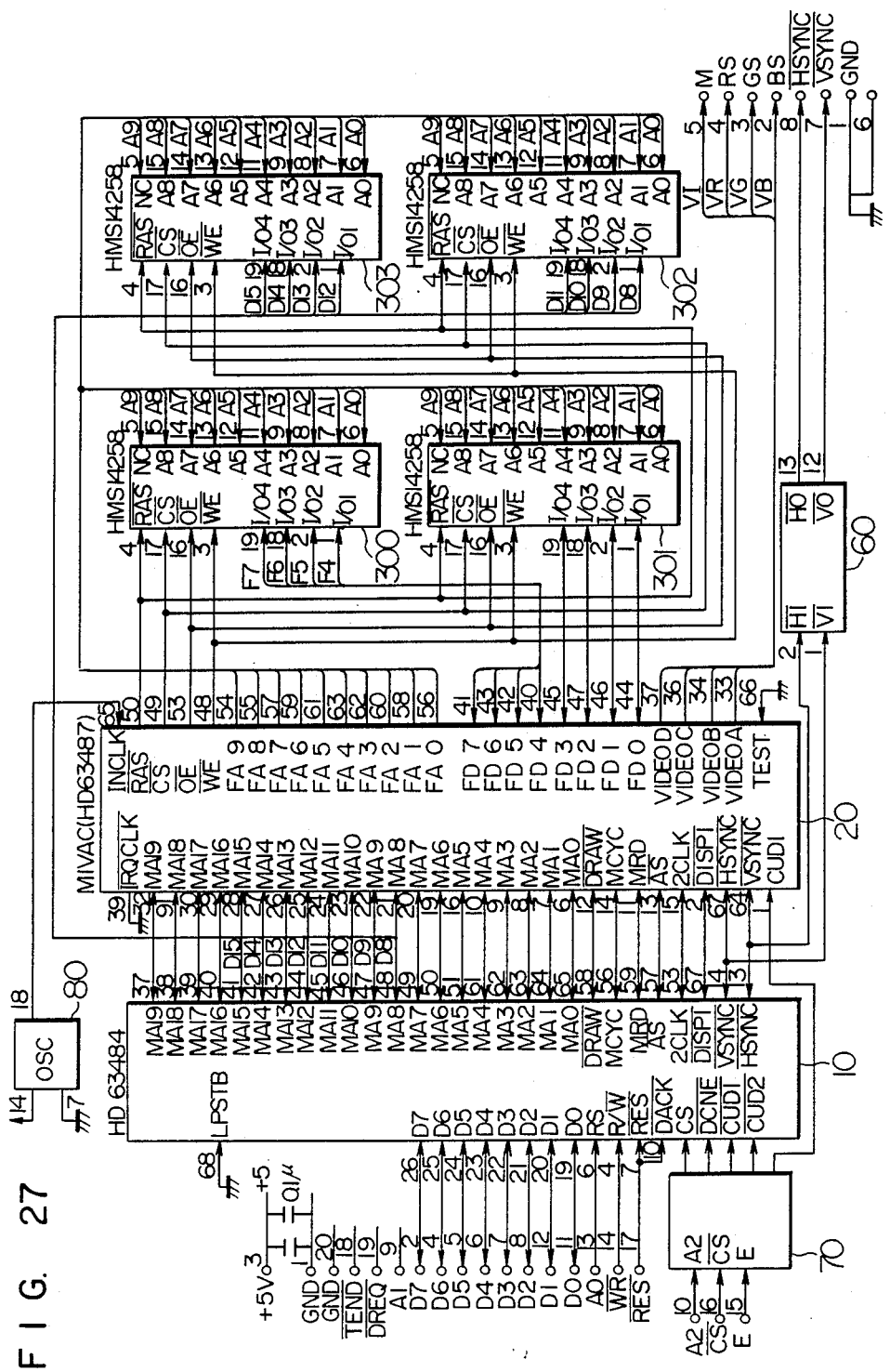
FIG. 27 is a diagram showing in detail the circuit configuration of the embodiment of FIG. 1.

FIG. 27 shows an exemplary configuration of a graphic processing apparatus including ACRTC 10, MIVAC 20, and DRAMs 300 to 303. A clock signal generated by the clock oscillator 80 is supplied as INCLK of the MIVAC 20. An external circuit 70 is utilized as an interface with the microprocessor (not shown in FIG. 27), and an interface circuit 60 is used for $\overline{HSYNC}$ and $\overline{VSYNC}$.

FIG. 28 shows a circuit example including an NAND gate. The configuration includes a bipolar transistor, an n-channel MOS transistor, and a p-channel MOS transistor. In a portion where the logic of the preceding stage is to be reflected, a CMOS of a low power consumption is employed, whereas in the output side of the succeeding stage, a bipolar transistor is used.

FIGS. 29a to 29c show in detail addresses supplied by the MIVAC 20 to the FA terminal. Cases of a one chip memory, a two chip memory, and a 4-chip memory are shown in FIGS. 29a to 29c, respectively. Signals (NC0 to NC2 and WC0 to WC2) enclosed with broken lines in FIGS. 29a to 29c are produced by the column address counter 2002. NC0 to NC2 are counters, each effective within a word, and bits 1 to 2 of the counter are used in the respective operation modes. WC0 to WC2 are word counters and are employed to generate a display address. The bit numbers of the address are not necessarily consecutive. This is because the bits are to be commonly used in the respective operation modes so as to configure the circuit of the multiplexer 2003 as simple as possible.

As described above, according to the present invention, the data bus width of the memory can be minimized, and hence the size of the graphic processing apparatus can be reduced.

We claim:

1. A graphic processing apparatus comprising:
   memory means, including a plurality of memory locations in an array of columns, having corresponding column addresses, and rows, having corresponding row addresses, for storing data;
   data processing means for specifying a row address in said memory means for retrieval of data from the memory locations at the different column addresses within the specified row of memory locations and processing of the retrieved data to generate graphic signals;
   memory control means;
   a memory data bus having m lines and interconnecting the memory means and the memory control means to transmit m bits of data in parallel therebetween, where m is an integer; and
   a processor data bus having n lines and interconnecting the data processing means and the memory control means to transmit n bits of data in parallel therebetween, where n is an integer and n>m;
   said memory control means including storage means for temporarily storing data received serially on said memory data bus from memory locations at different column addresses of the memory means row corresponding with the specified row address, and transmitting the temporarily stored data in parallel on said processor data bus to said data processing means for processing thereof to generate graphic signals.

2. A graphic processing apparatus comprising:
   memory means, including a plurality of memory locations in an array of columns, having corresponding column addresses, and rows, having corresponding row addresses, for storing data;
   data processing means for specifying a row address in said memory means for writing of data in the memory locations at the different column addresses within the specified row of memory locations;
   memory control means;
   a memory data bus having m lines and interconnecting the memory means and the memory control means to transmit m bits of data in parallel therebetween, where m is an integer; and
   a processor data bus having n lines and interconnecting the data processing means and the memory control means to transmit n bits of data in parallel therebetween, where n is an integer and n>m;
   said memory control means including multiplexer means for multiplexing data received in parallel on said processor data bus into serial data and applying the serial data to said memory data bus for writing thereof in memory locations at different column addresses of the memory means row corresponding with the specified row address.

3. A graphic processing apparatus comprising:
   memory means, including a plurality of memory locations in an array of columns, having corresponding column addresses, and rows, having corresponding row addresses, for storing data;
   data processing means for specifying a row address of memory locations in said memory means for transfer of a data word therewith;
   memory control means;
   a memory data bus having m lines and interconnecting the memory means and the memory control means to transmit m bits of data in parallel therebetween, where m is an integer; and
   a processor data bus having n lines and interconnecting the data processing means and the memory control means to transmit n bits of data in parallel therebetween, where n is a multiple of m;
   said memory control means including counter means, responsive to receipt on said processor data bus of a row address specified by said processor means to specify an n-bit data word in said memory means, for successively generating n column addresses, applying the received row address and m of the generated column addresses on said memory data bus to transfer data between said memory means and said data processor means, with the data transfer including transfer of m bits of data in parallel between said memory means and said memory control means, and transfer of n bits of data between said memory control means and said data processor means.

4. A graphic processing apparatus comprising:
   memory means, including a plurality of memory locations in an array of columns, having corresponding column addresses, and rows, having corresponding row addresses, for storing pixel information;
   data processing means for specifying addresses of memory locations in said memory means for retrieval of pixel information therefrom and processing of the retrieved pixel information to generate graphic signals;
   memory control means coupled to said memory means an said data processing means for retrieving pixel information from said memory means and applying the retrieved pixel information to said data processing means for processing thereof; and
   output means connected to said memory control means for outputting processed pixel information to generate graphics.

5. A graphic processing apparatus as claimed in claim 4, wherein the pixel information comprises multi-bit pixel information units corresponding to one pixel.

6. A graphic processing apparatus as claimed in claim 4, wherein the pixel information comprises pixel information units, and wherein said memory control means includes means for selecting the number of bits in each pixel information unit.

7. A graphic processing apparatus as claimed in claim 4, wherein said memory control means includes storage means for temporarily storing pixel information retrieved from said memory means.

8. A graphic processing apparatus comprising:
   memory means, including a plurality of memory locations in an array of columns, having corresponding column addresses, and rows, having corresponding row addresses, for storing data;
   data processing means for specifying a row address in said memory means for transfer of data between the data processing means and the memory locations at the different column addresses within the specified row of memory locations;
memory control means;
a memory data bus having m lines and interconnecting the memory means and the memory control means to transmit m bits of data in parallel therebetween, where m is an integer; and
a processor data bus having n lines and interconnecting the data processing means and the memory control means to transmit n bits of data in parallel therebetween, where n is an integer and $n > m$;
said memory control means including storage means for temporarilty storing data received on said memory bus from memory locations at different column addresses of the memory location row corresponding with the specified row address and transmitting the temporarily stored data in parallel on said processor data bus to said data processing means for processing thereof, and multiplexer means for multiplexing data received in parallel on said processor data bus into serial data and applying the serial data to said serial memory data bus for writing thereof in memory locations at different column addresses of the memory location row corresponding with the specified row address.

* * * * *